(12) United States Patent
Dai et al.

(10) Patent No.: US 12,381,985 B2
(45) Date of Patent: *Aug. 5, 2025

(54) VOICE MESSAGE DISPLAY

(71) Applicant: Tencent Technology (Shenzhen) Company Limited, Guangdong (CN)

(72) Inventors: Wei Dai, Shenzhen (CN); Kun Lu, Shenzhen (CN); Qinghua Zhong, Shenzhen (CN); Jun Wu, Shenzhen (CN); Yingren Wang, Shenzhen (CN); Rong Huang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,237

(22) Filed: Dec. 1, 2023

(65) Prior Publication Data

US 2024/0098182 A1    Mar. 21, 2024

Related U.S. Application Data

(63) Continuation of application No. 17/096,683, filed on Nov. 12, 2020, now Pat. No. 11,895,273, which is a
(Continued)

(30) Foreign Application Priority Data

Sep. 30, 2018 (CN) .......................... 201811159451.4

(51) Int. Cl.
*H04M 3/533* (2006.01)
*G06T 13/20* (2011.01)
*G06T 13/40* (2011.01)

(52) U.S. Cl.
CPC ....... *H04M 3/53333* (2013.01); *G06T 13/205* (2013.01); *G06T 13/40* (2013.01)

(58) Field of Classification Search
CPC ......... H04M 3/53333; H04M 2201/12; H04M 2201/14; H04M 2203/252; G06T 13/205;
(Continued)

(56) References Cited

U.S. PATENT DOCUMENTS 7,961,854 B1   6/2011  Ho et al.
8,812,358 B2 * 8/2014  Tirpak .................. A63F 13/795
                                                        705/14.4
(Continued)

FOREIGN PATENT DOCUMENTS

CN        102821065 A    12/2012
CN        103209201 A     7/2013
(Continued)

OTHER PUBLICATIONS

International Search Report and Written Opinion received for PCT Patent Application No. PCT/CN2019/106116, mailed on Nov. 28, 2019, 11 pages (5 pages of English Translation and 6 pages of Original Document).
(Continued)

*Primary Examiner* — Akelaw Teshale
(74) *Attorney, Agent, or Firm* — ARENTFOX SCHIFF LLP

(57) ABSTRACT

Aspects of this disclosure are directed to a method and a terminal device, and a computer-readable storage medium. The terminal device includes processing circuitry that obtains n voice messages from at least one user account. n is a positive integer. The processing circuitry displays a voice message presentation interface. The voice message presentation interface is configured to display virtual characters corresponding to the n voice messages in a virtual
(Continued)

world. Locations of the n voice messages in the virtual world are based on whether the n voice messages are unplayed. The virtual characters can be based on respective message attributes of the n voice messages.

20 Claims, 20 Drawing Sheets

Related U.S. Application Data continuation of application No. PCT/CN2019/106116, filed on Sep. 17, 2019.

(58) Field of Classification Search
CPC ......... G06T 13/40; H04L 51/10; H04L 51/52; H04L 67/125; H04L 67/04; H04L 51/04
See application file for complete search history.

(56) References Cited

U.S. PATENT DOCUMENTS

| | | | |
|---|---|---|---|
| 8,924,880 B2 * | 12/2014 | Altberg | H04N 7/157 |
| | | | 715/706 |
| 9,363,378 B1 * | 6/2016 | McDaniel | H04M 3/533 |
| 9,615,190 B1 * | 4/2017 | Norris | H04M 9/085 |
| 9,990,623 B2 * | 6/2018 | Smith | H04M 15/80 |
| 10,499,179 B1 * | 12/2019 | Lyren | H04S 7/302 |
| 10,638,256 B1 * | 4/2020 | Suiter | G06F 3/011 |
| 10,963,648 B1 * | 3/2021 | Bill | H04L 51/10 |
| 2007/0218986 A1 * | 9/2007 | Van Luchene | A63F 13/87 |
| | | | 463/30 |
| 2007/0218987 A1 | 9/2007 | Van et al. | |
| 2008/0163075 A1 | 7/2008 | Beck et al. | |
| 2008/0263460 A1 * | 10/2008 | Altberg | G06Q 30/02 |
| | | | 715/757 |
| 2009/0210483 A1 * | 8/2009 | Pierce | G06N 3/006 |
| | | | 709/203 |
| 2009/0215433 A1 * | 8/2009 | Cavanaugh | A63F 13/12 |
| | | | 455/414.1 |
| 2010/0070501 A1 | 3/2010 | Walsh et al. | |
| 2010/0070980 A1 | 3/2010 | Tanaka et al. | |
| 2010/0211638 A1 | 8/2010 | Rougier | |
| 2011/0200180 A1 * | 8/2011 | Mccarthy | H04M 3/53333 |
| | | | 379/88.08 |
| 2012/0185547 A1 | 7/2012 | Hugg et al. | |
| 2013/0268490 A1 | 10/2013 | Keebler et al. | |
| 2014/0058807 A1 * | 2/2014 | Altberg | H04L 12/66 |
| | | | 348/14.08 |
| 2014/0330550 A1 * | 11/2014 | Bill | H04N 21/44222 |
| | | | 704/2 |
| 2015/0032675 A1 | 1/2015 | Huehn et al. | |
| 2016/0110922 A1 * | 4/2016 | Haring | G06T 13/40 |
| | | | 345/633 |
| 2016/0142361 A1 * | 5/2016 | Grossman | H04W 4/21 |
| | | | 709/206 |
| 2016/0302711 A1 | 10/2016 | Frank et al. | |
| 2018/0097749 A1 * | 4/2018 | Ventura | G06F 16/93 |
| 2018/0104594 A1 | 4/2018 | Aronzon et al. | |
| 2020/0197810 A1 * | 6/2020 | Kung | H04N 21/42203 |
| 2024/0192734 A1 * | 6/2024 | Castro | F16M 11/22 |

FOREIGN PATENT DOCUMENTS

| | | |
|---|---|---|
| CN | 106171038 A | 11/2016 |
| CN | 106774830 A | 5/2017 |
| CN | 106817349 A | 6/2017 |
| CN | 107026894 A | 8/2017 |
| CN | 107222398 A | 9/2017 |
| CN | 107623622 A | 1/2018 |
| CN | 107707538 A | 2/2018 |
| CN | 108037869 A | 5/2018 |
| JP | 2012-129663 A | 7/2012 |
| WO | 2010/075628 A1 | 7/2010 |

OTHER PUBLICATIONS

Office Action received for Chinese Patent Application No. 201811159451.4, mailed on Mar. 18, 2021.

Office Action received for Chinese Patent Application No. 202111199895.2, mailed on Jun. 1, 2022.

* cited by examiner 183
182
181

Voice element layer (bird + voice)

Background visual layer (tree)

Ambient atmosphere layer
(blue sky, white cloud, and lawn)

| Published duration | Type of virtual character | Character model |
|---|---|---|
| ≤1 minute | Bird 1 |  |
| 1 minute to 30 minutes | Bird 2 |  |
| 30 minutes to 2 hours | Bird 3 |  |
| 2-4 hours | Bird 4 |  |
| 4-24 hours | Bird 5 |  |
| >24 hours | Bird 6 |  |

| Corresponding bird image |  |  |  |  |
|---|---|---|---|---|
| Published duration | 1-5 seconds | 6-10 seconds | 10-30 seconds | 30-60 seconds |

VOICE MESSAGE DISPLAY

RELATED APPLICATION

This application is a continuation of U.S. application Ser. No. 17/096,683, filed on Nov. 12, 2020, which is a continuation of International Application No. PCT/CN2019/106116, filed on Sep. 17, 2019, which claims priority to Chinese Patent Application No. 201811159451.4, entitled "VOICE MESSAGE DISPLAY METHOD AND APPARATUS IN APPLICATION, DEVICE, AND STORAGE MEDIUM" filed on Sep. 30, 2018. The entire disclosures of the prior applications are hereby incorporated by reference in their entirety.

FIELD OF THE TECHNOLOGY

Embodiments of this application relate to the field of computer programs, including a voice message display method and apparatus in an application (APP), a computer device, and a computer-readable storage medium.

BACKGROUND OF THE DISCLOSURE

Social APPs are APPs most commonly used by users on mobile terminals. Social APPs mainly use text and pictures as communication media, but in emerging social APPs voice messages are used as a communication medium. In the social APPs using voice messages as a communication medium, voice messages are displayed as a plurality of voice cells arranged in reverse chronological order of uploading times, and each voice cell corresponds to one voice message. Further, each voice cell can have a corresponding rounded rectangular box, and a user may click the voice cell to play the voice message.

Because presentation effects of the voice messages on an interface are basically the same, it can be difficult for the users to accurately distinguish the respective voice messages, and it consumes more time to sift through different voice messages.

SUMMARY

Embodiments of this application provide a voice message display method and apparatus in an APP, a computer device, and a computer-readable storage medium.

A voice message display method in an APP is provided that can be performed by a terminal. The method can include starting an APP according to an operation signal, obtaining n voice messages published by at least one user account, where n is a positive integer, and displaying a voice message presentation interface of the APP, the voice message presentation interface displaying the voice message in a virtual world, the voice message being displayed by using a visible element in the virtual world as a carrier.

A voice message display apparatus in an APP can also be provided. The apparatus can include processing circuitry that can be configured to start an APP according to a start operation, obtain n voice messages published by at least one user account, where n is a positive integer, and display a voice message presentation interface of the APP, the voice message presentation interface displaying the voice message in a virtual world, the voice message being displayed by using a visible element in the virtual world as a carrier.

A computer device is provided, including a memory and a processor, the memory storing at least one program that, when executed by the processor, causes the processor to implement the foregoing voice message display method in an APP.

A non-transitory computer-readable storage medium is provided, storing at least one program, the at least one program being loaded and executed by the processor to implement the foregoing voice message display method in an APP.

Details of one or more exemplary embodiments of this application are provided in the following accompany drawings and descriptions. Other features, objectives, and advantages of this application will become apparent from the specification, the accompanying drawings, and the claims.

BRIEF DESCRIPTION OF THE DRAWINGS

To describe the technical solutions of the exemplary embodiments of this application more clearly, the following briefly describes the accompanying drawings required for describing the embodiments. Of course, the accompanying drawings in the following description show only some embodiments of this application, and a person of ordinary skill in the art may still derive other accompanying drawings from the accompanying drawings.

DESCRIPTION OF EMBODIMENTS

To make objectives, technical solutions, and advantages of the embodiments of this application clearer, the following further describes in detail implementations of this application with reference to the accompanying drawings.

A voice social APP is a social APP based on voice messages and is also referred to as a sound social APP. Voice social APPs account for 7.5% of a plurality of social APPs in a ranking list of free social APPs of a specific APP store. In addition, conventional radio APPs also have social attributes added, hoping to occupy a place in the vertical market of voice social APPs.

Figure 1:
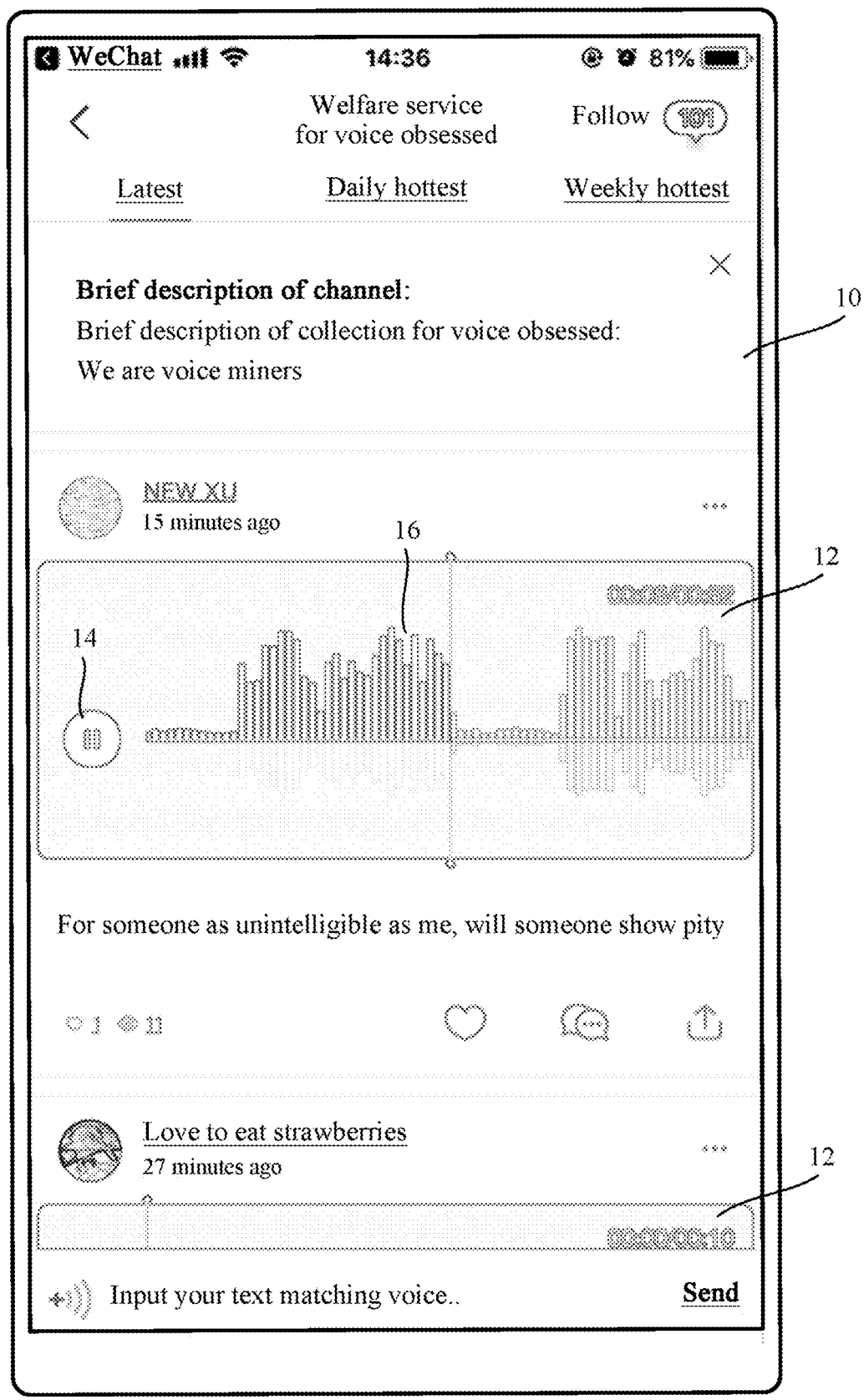
FIG. 1 is a schematic diagram of an interface of a voice message display method provided in the related art.

Voice messages can be displayed by using a feed stream in voice social APPs, and the feed stream combines a plurality of message sources to which a user is actively subscribed to form a content aggregator, to help the user keep obtaining latest subscription source content. The feed stream is usually displayed in a form of a timeline in a user interface (UI). As shown in FIG. 1, in a feed stream 10, a plurality of voice cells 12 are sorted and displayed in chronological order of publishing times, the voice cells 12 and voice messages are in a one-to-one correspondence. Each voice cell 12 is displayed as a rectangular box, and each rectangular box is provided with a play button 14 and a voice print 16, and the voice print 16 corresponds to the voice message. When a user clicks a play button 14 on a specific voice cell 12, playback of a voice message corresponding to the voice cell 12 is triggered.

However, the voice cells 12 are basically the same in terms of presentation effects on an interface and may be different from each other only in terms of voice prints, so that the user cannot accurately distinguish which voice messages are played voice messages and which voice messages are unplayed voice messages. When there are relatively few voice messages displayed in the same UI, the user needs to drag different voice cells 12 in the feed stream up and down, and continuously search the plurality of voice cells 12. Therefore, more time and operation steps need to be consumed to sift different voice messages, resulting in relatively low efficiency of man-machine interaction.

The embodiments of this application provide an improved display solution for a voice message by constructing a virtual world and displaying a voice message through a virtual character in the virtual world, each voice message corresponding to a respective virtual character. In an embodiment, the virtual world is a virtual forest world, the virtual character is a bird in the virtual forest world, each voice message corresponds to a respective bird, and display manners of some bird are different. In another embodiment, the virtual world is a virtual ocean world, the virtual character is a fish in the virtual ocean world, each voice message corresponds to a respective fish, and display manners of some fish are different. Therefore, the user can distinguish different voice messages according to virtual characters having different display manners relatively easily. Even played voice messages and unplayed voice messages can be distinguished according to the different display manners.

Figure 2:
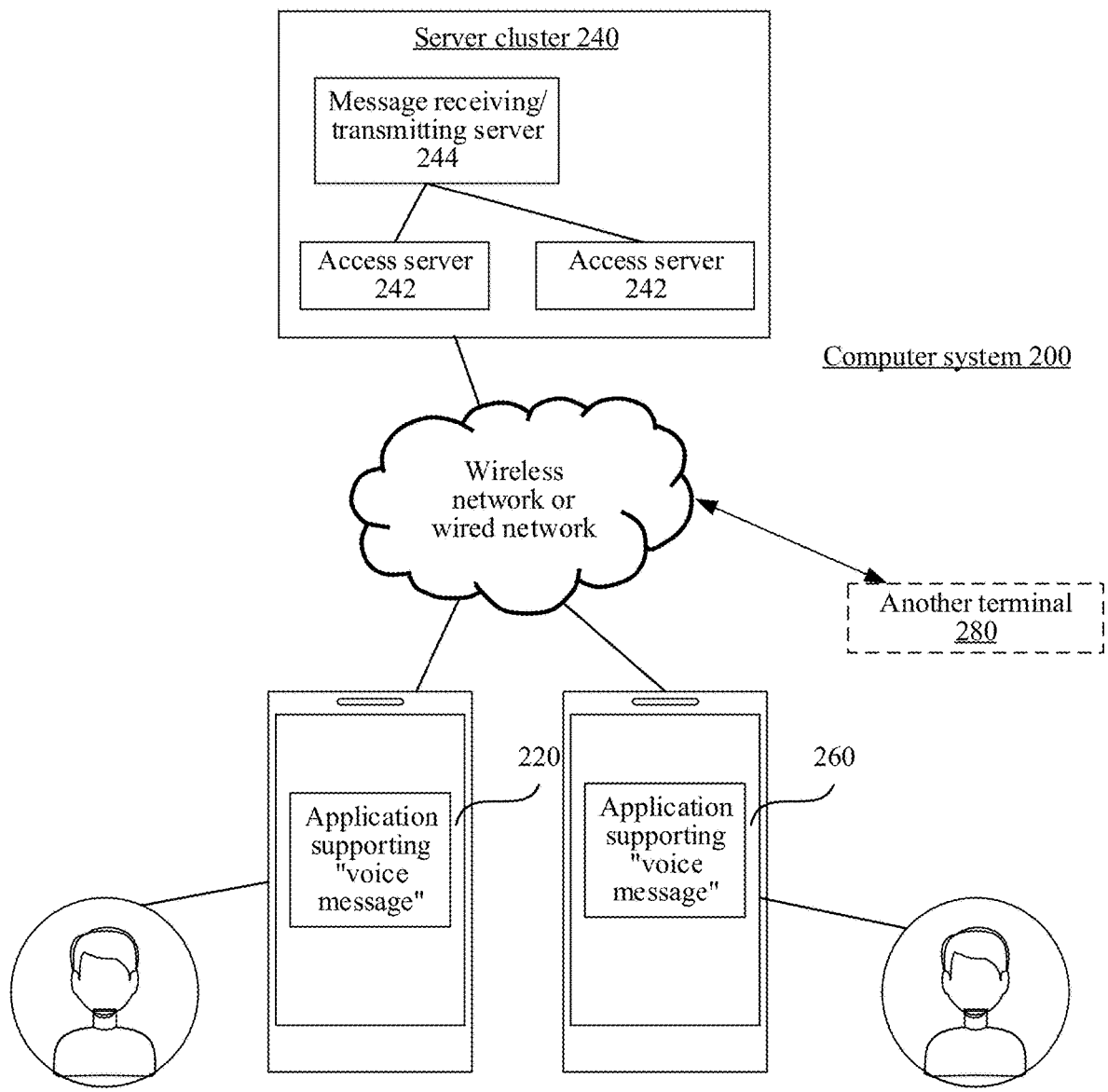
FIG. 2 is a structural block diagram of a computer system according to an exemplary embodiment of this application.

FIG. 2 is a structural block diagram of a computer system 200 according to an exemplary embodiment of this application. The computer system 200 may be an instant messaging system, a team voice chat system, or another APP system having a social attribute. Of course, this is not limited in this embodiment of this application. The computer system 200 can include a first terminal 220, a server cluster 240, and a second terminal 260.

The first terminal 220 is connected to the server cluster 240 through a wireless network or wired network. The first terminal 220 may be at least one of a smartphone, a game console, a desktop computer, a tablet computer, an ebook reader, a Moving Picture Experts Group Audio Layer III (MP3) player, a Moving Picture Experts Group Audio Layer IV (MP4) player, and a portable laptop computer. An APP supporting a voice message is installed and run on the first terminal 220. The APP may be any one of a voice social APP, an instant messaging APP, a team voice APP, a social APP aggregating people based on topics, channels, or circles, and a social APP based on shopping. The first terminal 220 is a terminal used by a first user, and a first user account logs in to an APP run on the first terminal 220.

The first terminal 220 is connected to the server cluster 240 through a wireless network or a wired network.

The server cluster 240 includes at least one of one server, a plurality of servers, a cloud computing platform, and a virtualization center. The server cluster 240 is configured to provide a backend service for the APP supporting a voice message. Optionally, the server cluster 240 takes on primary computing work, and the first terminal 220 and the second terminal 260 take on secondary computing work; alternatively, the server cluster 240 takes on secondary computing work, and the first terminal 220 and the second terminal 260 take on primary computing work; alternatively, collaborative computing is performed by using a distributed computing architecture among the server cluster 240, the first terminal 220, and the second terminal 260.

Optionally, the server cluster 240 can include an access server 242 and a message forwarding server 244. The access server 242 is configured to provide an access service and an information receiving/transmitting service for the first terminal 220 and the second terminal 260, and forward a message, such as a voice message, a text message, a picture message, or a video message, between a terminal and the message forwarding server 244. The message forwarding server 244 is configured to provide a background service for the APP, for example, at least one of a friend adding service, a text message forwarding service, a voice message forwarding service, and a picture message forwarding service. There may be one or more message forwarding servers 244. When there are a plurality of message forwarding servers 244, there are at least two message forwarding servers 244 configured to provide different services, and/or there are at least two message forwarding servers 244 configured to provide the same service, for example, provide the same service in a load-balancing manner. Of course, this is not limited in this embodiment of this application.

An APP supporting a voice message is installed and run on the second terminal 260. The APP may be any one of a voice social APP, an instant messaging APP, a team voice APP, a social APP aggregating people based on topics, channels, or circles, and a social APP based on shopping. The second terminal 260 is a terminal used by a second user. A second user account logs in to an APP in the second terminal 220.

Optionally, the first user account and the second user account are in a virtual social network, and the virtual social network provides a propagation approach for voice messages between the first user account and the second user account. The virtual social network may be provided by the same social platform, or may be provided by a plurality of social platforms having an association relationship (for example, an authorized login relationship) cooperatively. A specific form of the virtual social network is not limited in this embodiment of this application. Optionally, the first user account and the second user account may belong to the same team or the same organization, have a friend relationship, or have a temporary communication permission. Optionally, the first user account and the second user account may also be in an unfamiliar relationship. In a word, the virtual social network provides a one-way message propagation approach or a two-way message propagation approach between the first user account and the second user account, to help voice messages propagate between different user accounts.

Further, the APPs can be installed on the first terminal 220 and the second terminal 260 are the same, or the APPs can be installed on the two terminals are the same type of APPs of different operating system platforms, or the APPs can be installed on the two terminals are different but support the same type of voice message. Different operating systems can include an Apple's operating system, an Android operating system, a Linux operating system, a Windows operating system, and the like.

The first terminal 220 may generally refer to one of a plurality of terminals, the second terminal 260 may generally refer to one of a plurality of terminals, and in this embodiment, and description is made by using only the first terminal 220 and the second terminal 260 as an example. Terminal types of the first terminal 220 and the second terminal 260 are the same or different. The terminal type includes at least one of a smartphone, a game console, a desktop computer, a tablet computer, an ebook reader, an MP3 player, an MP4 player, and a laptop computer. In the following embodiments, description is made by using an example in which the first terminal 220 and/or the second terminal 240 is a smartphone.

A person skilled in the art may learn that there may be more or fewer terminals. For example, there may be only one terminal, or there may be dozens of or hundreds of or more terminals. In this case, the computer system further includes another terminal 280. The quantity and the device types of the terminals are not limited in this embodiment of this application.

Figure 3:
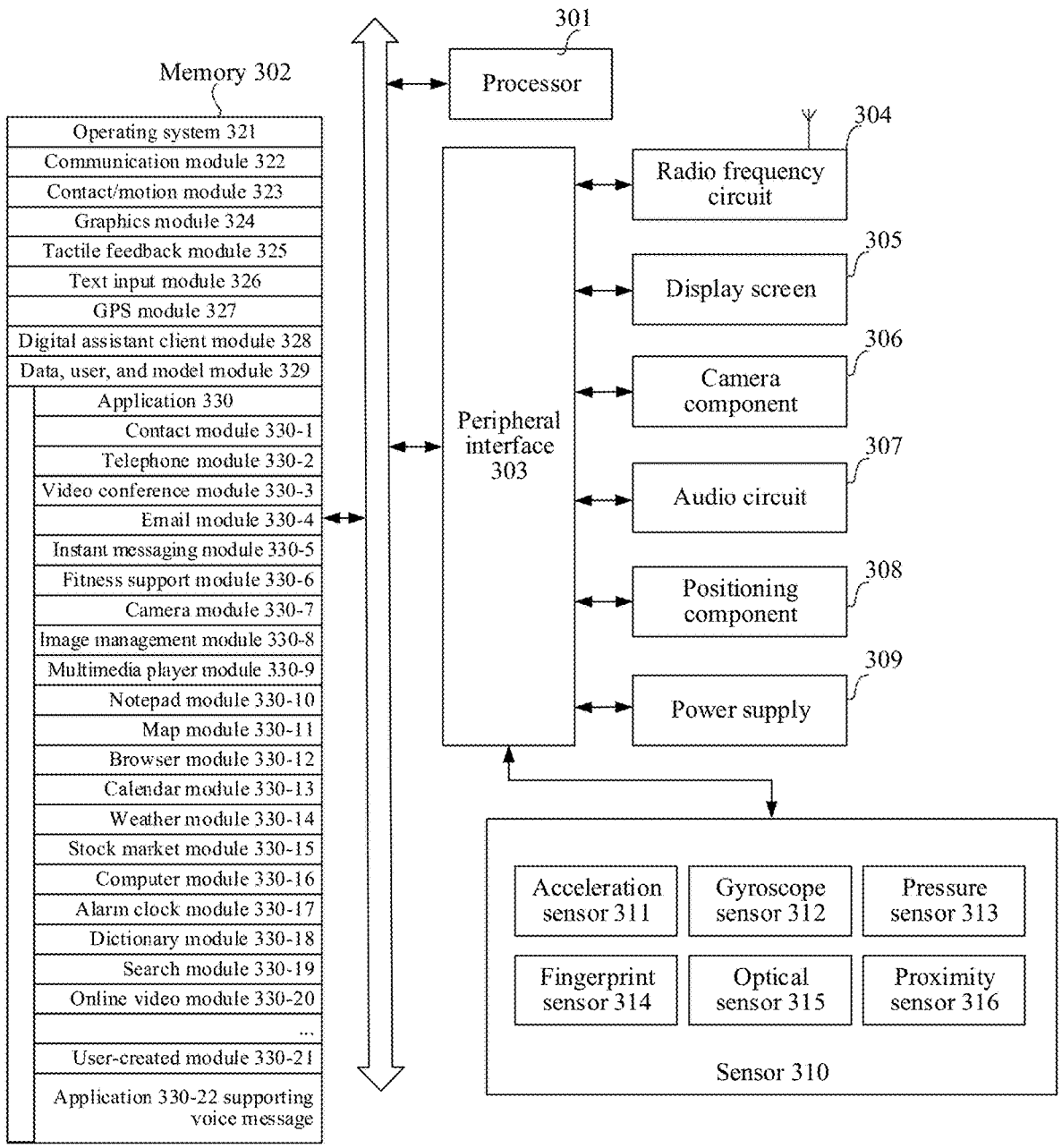
FIG. 3 is a structural block diagram of a terminal according to an exemplary embodiment of this application.

FIG. 3 is a structural block diagram of a terminal 300 according to an exemplary embodiment of this application. The terminal 300 may be a smartphone, a tablet computer, an MP3 player, an MP4 player, a notebook computer, or a desktop computer. The terminal 300 may also be referred to as user equipment, a portable terminal, a laptop terminal, a desktop terminal, or another name. The terminal 300 may be a first terminal or a second terminal.

Generally, the terminal 300 includes a processor 301 and a memory 302. The processor 301 may include one or more processing cores, and for example, may be a 4-core processor or an 8-core processor. The processor 301 may be implemented by using at least one hardware form of digital signal processing (DSP), a field-programmable gate array (FPGA), and a programmable logic array (PLA). The processor 301 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 301 may be integrated with a graphics processing unit (GPU). The GPU is configured to be responsible for rendering and drawing content to be displayed by a display screen. In some embodiments, the processor 301 may further include an artificial intelligence (AI) processor. The AI processor is configured to process a computing operation related to machine learning.

The memory 302 may include one or more non-transitory computer-readable storage media. The computer-readable storage medium may be non-transitory. The memory 302 may further include a high-speed random access memory, and a non-volatile memory such as one or more magnetic disk storage devices and a flash storage device. In some embodiments, the non-transitory computer-readable storage medium in the memory 302 is configured to store at least one instruction, and the at least one instruction is used for being executed by the processor 301 to implement the voice message display method in an APP provided in the method embodiments of this application.

In some embodiments, the terminal 300 further optionally includes a peripheral interface 303 and at least one peripheral. The processor 301, the memory 302, and the peripheral interface 303 may be connected through a bus or a signal cable. Each peripheral may be connected to the peripheral interface 303 through a bus, a signal cable, or a circuit board. Specifically, the peripheral includes: at least one of a radio frequency (RF) circuit 304, a display screen 305, a camera component 306, an audio circuit 307, a positioning component 308, and a power supply 309. The peripheral interface 303 may be configured to connect at least one peripheral related to input/output (I/O) to the processor 301 and the memory 302. The display screen 305 is configured to display a UI. The UI may include a graph, text, an icon, a video, and any combination thereof. When the display screen 305 is a touch display screen, the display screen 305 is further capable of obtaining a touch signal on or above a surface of the display screen 305. The camera component 306 is configured to obtain an image or a video.

The audio circuit 307 may include a microphone and a speaker. The microphone is configured to: obtain sound waves of a user and an environment, and convert the sound waves into electrical signals and input the electrical signals into the processor 301 for processing, or input the electrical signals into the RF circuit 304 to implement speech communication. The positioning component 308 is configured to position a current geographic location of the terminal 300 for implementing navigation or a location based service (LBS). The power supply 309 is configured to supply power for various components in the terminal 300. The power supply 309 may be an alternating current, a direct current, a disposable battery, or a rechargeable battery.

In some embodiments, the terminal 300 may further include one or more sensors 310. The one or more sensors 310 include, but are not limited to, an acceleration sensor 311, a gyroscope sensor 312, a pressure sensor 313, a fingerprint sensor 314, an optical sensor 315, and a proximity sensor 316. The acceleration sensor 311 may detect accelerations on three coordinate axes of a coordinate system established by the terminal 300. The gyroscope sensor 312 may detect a body direction and a rotation angle of the terminal 300. The gyroscope sensor 312 may cooperate with the acceleration sensor 311 to collect a 3D action by the user on the terminal 300. The pressure sensor 313 may be disposed on a side frame of the terminal 300 or a lower layer of the display screen 305. When the pressure sensor 313 is disposed on the side frame of the terminal 300, a holding signal of the user to the terminal 300 may be detected, and left/right hand identification or a shortcut operation may be performed by the processor 301 according to the holding signal collected by the pressure sensor 313. When the pressure sensor 313 is disposed on the lower layer of the display 305, the processor 301 controls an operable control on the UI according to a pressure operation of the user on the display 305. The fingerprint sensor 314 is configured to collect a user's fingerprint, and the processor 301 identifies a user's identity according to the fingerprint collected by the fingerprint sensor 314, or the fingerprint sensor 314 identifies a user's identity according to the collected fingerprint. The optical sensor 315 is configured to collect ambient light intensity. The proximity sensor 316, also referred to as a distance sensor, is usually disposed on a front panel of the terminal 300. The proximity sensor 316 is configured to collect a distance between a user and the front surface of the terminal 300.

Optionally, the memory 302 further includes the following program modules (or instruction sets), or a subset or a superset thereof: an operating system 321; a communication module 322; a contact/motion module 323; a graphics module 324; a tactile feedback module 325; a text input module 326; a GPS module 327; a digital assistant client module 328; a data, user, and model module 329; and APPs 330: a contact module 330-1, a telephone module 330-2, a video conference module 330-3, an email module 330-4, an instant messaging module 330-5, a fitness support module 330-6, a camera module 330-7, an image management module 330-8, a multimedia player module 330-9, a notepad module 330-10, a map module 330-11, a browser module 330-12, a calendar module 330-13, a weather module 330-14, a stock market module 330-15, a computer module 330-16, an alarm clock module 330-17, a dictionary module 330-18, a search module 330-19, an online video module 330-20, . . . , and a user-created module 330-21. Of course, one or more of the modules described in this disclosure can be implemented by processing circuitry.

In the embodiments of this application, the memory 302 further includes an APP 330-22 supporting a voice message. The APP 330-22 may be configured to implement the voice message display method in an APP in the following method embodiments.

A person skilled in the art may understand that the structure shown in FIG. 3 does not constitute a limitation on the terminal 300, and more or fewer components than those shown in the figure may be included, or some components may be combined, or a different component deployment may be used.

This application further provides a non-transitory computer-readable storage medium, the computer-readable storage medium storing at least one instruction, at least one program, a code set, or an instruction set, the at least one instruction, the at least one program, the code set, or the instruction set being loaded and executed by a processor to implement the voice message display method in an APP according to the embodiments of this application.

Figure 4:
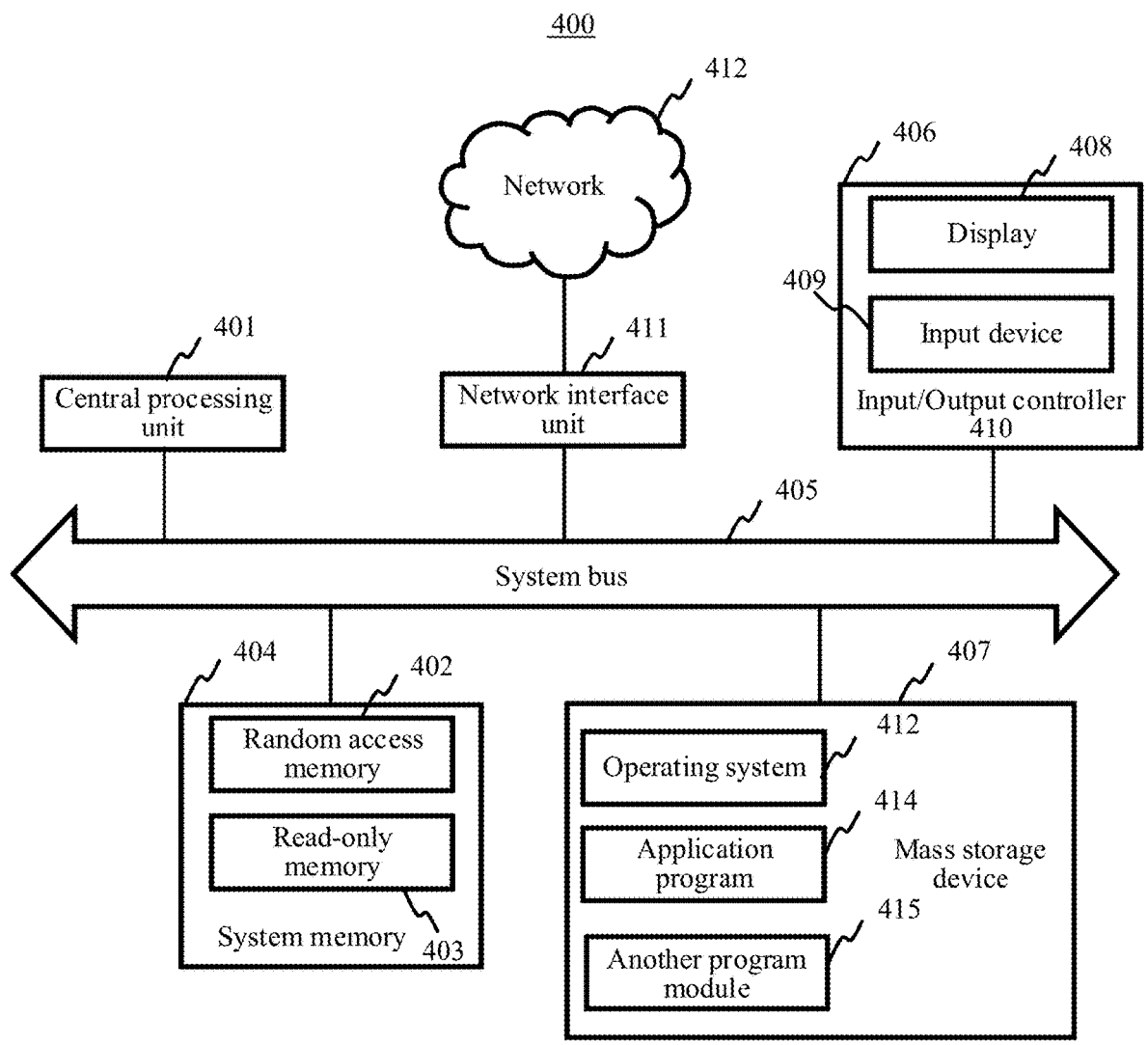
FIG. 4 is a structural block diagram of a server according to an exemplary embodiment of this application.

FIG. 4 is a schematic structural diagram of a server according to an exemplary embodiment of this application. The server may be implemented as any server in the foregoing server cluster 240. Schematically, a server 400 includes a central processing unit (CPU) 401, a system memory 404 including a random access memory (RAM) 402 and a read-only memory (ROM) 403, and a system bus 405 connecting the system memory 404 and the CPU 401. The server 400 further includes a basic input/output system (I/O system) 406 for transmitting information between components in a computer, and a mass storage device 407 configured to store an operating system 413, a client 414, and another program module 415.

The basic I/O system 406 includes a display 408 configured to display information and an input device 409 such as a mouse or a keyboard that is configured for information inputting by a user. The display 408 and the input device 409 are both connected to the CPU 401 by an input/output (I/O) controller 410 connected to the system bus 405. The basic I/O system 406 may further include the input/output controller 410, to receive and process inputs from a plurality of other devices, such as the keyboard, the mouse, or an electronic stylus. Similarly, the input/output controller 410 further provides an output to a display, a printer or another type of output device.

The mass storage device 407 is connected to the CPU 401 by using a mass storage controller (not shown) connected to the system bus 405. The mass storage device 407 and an associated computer-readable medium provide non-volatile storage for the server 400. That is, the mass storage device 407 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the foregoing several types. The system memory 404 and the mass storage device 407 may be collectively referred to as a memory.

According to various embodiments of this application, the server 400 may further be connected, through a network such as the Internet, to a remote computer on the network and run. That is, the server 400 may be connected to a network 412 by using a network interface unit 411 connected to the system bus 405, or may be connected to another type of network or remote computer system (not shown) by using the network interface unit 411.

Figure 5:
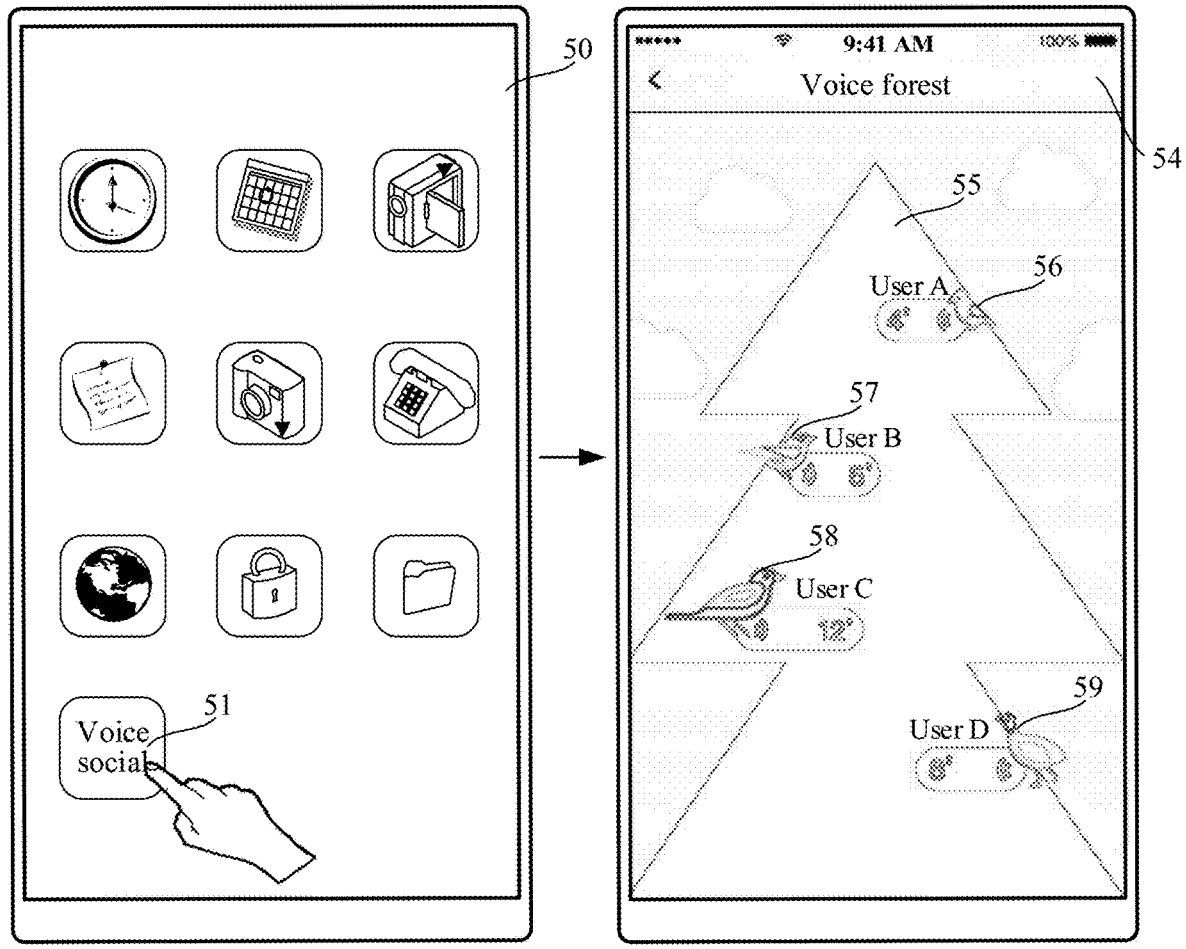
FIG. 5 is a schematic diagram of an interface of a voice message display method according to an exemplary embodiment of this application.
Figure 6:
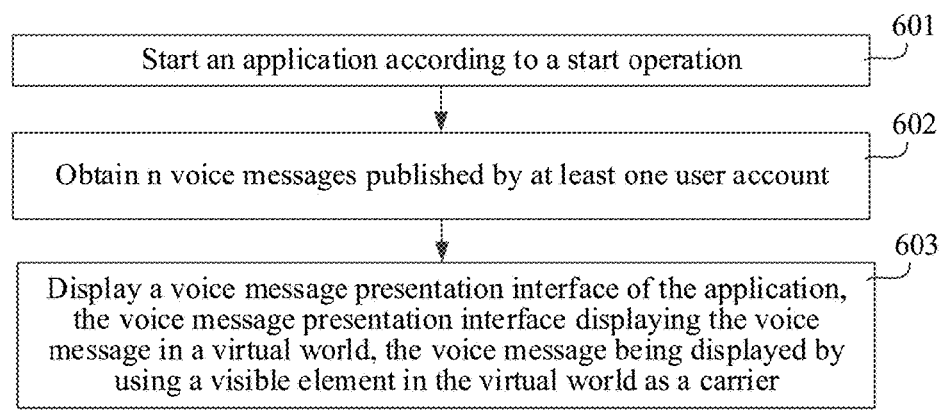
FIG. 6 is a flowchart of a voice message display method according to an exemplary embodiment of this application.
Figure 7:
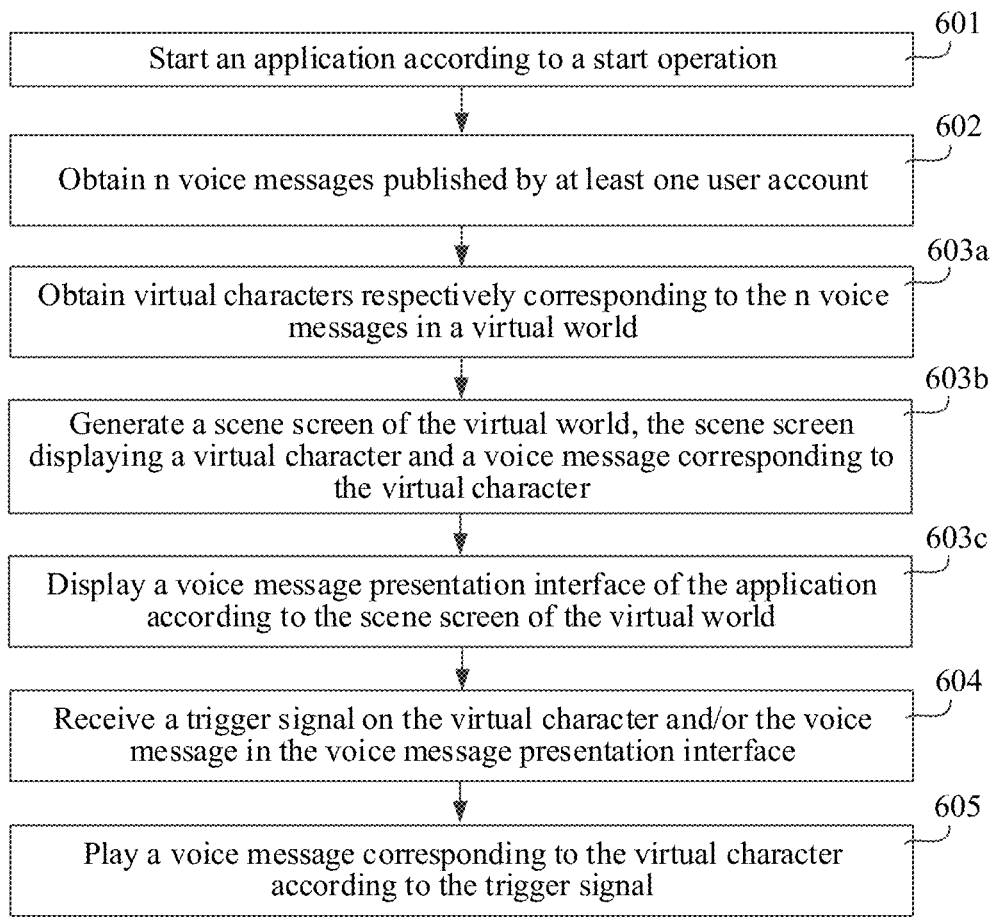
FIG. 7 is a flowchart of a voice message display method according to an exemplary embodiment of this application.

FIG. 5 and FIG. 6 show a schematic diagram of an interface of and a flowchart of a voice message display method in an APP according to an exemplary embodiment of this application respectively. A user installs an APP supporting a capability of transmitting and/or receiving a voice message on a terminal. After the APP is installed, an icon of the APP is displayed at a home page of the terminal.

In a standby state of the terminal, a home page 50 of the terminal displays a program icon 51 of the APP. When a user wants to use the APP, the user performs a start operation on the program icon 51 of the APP. The start operation may be a click operation acting on the program icon 51 of the APP.

In step 601, the method can start an APP according to a start operation. A terminal calls a start process of the APP, and starts the APP to enter a foreground running state through the start process. After the APP is started, a user account is logged in to at the server. The user account is used for uniquely identifying each user, a first user account is logged in to in the APP, and other user accounts are logged in to in APPs in other terminals, for example, a second user account and a third user account. Each user publishes (or uploads or transmits) a generated voice message in a respective APP.

In step 602, the method can obtain n voice messages published by at least one user account. The APP obtains n voice messages published by at least one user account from the server, and the at least one user account is usually a user account other than the first user account. However, an implementation in which the n voice messages include a voice message uploaded by the first user account is not excluded. Optionally, n is at least one, but in most embodiments, where n is a positive integer greater than 1.

The voice message refers to a message transmitting information through a voice signal. In some embodiments, the voice message only includes a voice signal. In some other embodiments, the voice message refers to a message transmitting information through a voice signal, for example, the voice message includes the voice signal and supplementary explanatory text; in another example, the voice message includes the voice signal and a supplementary explanatory picture; and in another example, the voice message includes the voice signal, the supplementary explanatory text, and the supplementary explanatory picture. In this embodiment, an example in which the voice message only includes the voice signal is used for description.

When obtaining a voice message, the APP may first obtain a message identifier of the voice message, and obtain message content of the voice message from the server according to the message identifier when the voice message needs to be played. Optionally, the APP may alternatively directly obtain the message content of the voice message and buffer the message content locally.

In step 603, the method can display a voice message presentation interface of the APP, the voice message presentation interface displaying the voice message in a virtual world, the voice message being displayed by using a visible element in the virtual world as a carrier.

The APP provides various UIs, and the voice message presentation interface is one of the various UIs. In some possible implementations, after an APP is started, a voice message presentation interface is displayed by default. As shown in FIG. 5, after a program icon 51 of the APP is clicked, a voice message presentation interface 54 starts to be displayed by default. In some other possible implementations, after an APP is started, a home page is displayed by default, the home page provides various function options, and the user needs to select among the various function options, to control the APP to display the voice message presentation interface 54. In an example shown in FIG. 8, after an APP is started, a home page is displayed by default, the home page displays a list expansion function option 52, and list expansion is short for expanding a friend list. After the user clicks the list expansion function option 52, the APP jumps to a list expansion function interface, the list expansion function interface includes three tab pages: List expansion, List expansion group, and Voice forest. A tab page named List expansion is displayed first by default in an initial state. When the user clicks the tab page named Voice forest, the APP jumps to display a voice message presentation interface 54. It should be understood that a display level and a jump path of the voice message presentation interface 54 in the APP is not limited in this embodiment.

The voice message presentation interface is used for displaying a UI of a voice message published by at least one user account. According to different classifications of the user accounts, in some embodiments, the voice message presentation interface is a UI used for displaying a voice message published by an unfamiliar user account. In some other embodiments, the voice message presentation interface is a UI used for displaying voice messages published by user accounts in the same topic (or the channel, or the circle, or the theme). In some other embodiments, the voice message presentation interface is a UI used for displaying voice messages published by user accounts belonging to the same area, for example, a current city or school.

A voice message in a virtual world is displayed in the voice message presentation interface, and the voice message is displayed by using a visible element in the virtual world as a carrier. The virtual world may be a two-dimensional word, a 2.5-dimensional word, or a three-dimensional world.

The visible element may be any object or material observable in the virtual world. The visible element includes, but is not limited to: at least one of cloud, fog, thunder and lightning, a fluid, a static object, a plant, an animal, a virtual image, and a cartoon image.

Optionally, when the voice message is displayed by using the visible element in the virtual world as the carrier, the APP may display the voice message as the visible element in the virtual world, or may associate or mount the voice message on a peripheral side of the visible element in the virtual world for display. This is not limited in this embodiment.

In a possible embodiment, using an example in which the visible element is a virtual character in the virtual world, as shown in FIG. 6, this step may include the following steps.

In step 603*a*, the method can obtain virtual characters respectively corresponding to the n voice messages in the virtual world.

In step 603*b*, the method can generate a scene screen of the virtual world, the scene screen displaying the virtual characters and the voice messages corresponding to the virtual characters.

In step 603*c*, the method can display the voice message presentation interface of the APP according to the scene screen of the virtual world.

For step 603*a*, the APP needs to obtain virtual characters respectively corresponding to the n voice messages, and each voice message corresponds to a virtual character. The virtual character is an individual element observable in a virtual universe. That is, the virtual character is an element that can be individually distinguished clearly at a visible angle. The virtual character may be a living character in the virtual world. In some embodiments, the virtual character is a character displayed by using a character model in a form of a cartoon, a plant and/or an animal. Schematically, the virtual character is at least one type of various flower characters, mammal characters, bird characters, reptile characters, amphibian characters, fish characters, dinosaur characters, animation and comic characters, and other fictional characters.

Optionally, there are same or different virtual characters corresponding to at least two voice message. The virtual character is a character in the virtual world. Classified according to a world attribute, the virtual world may be at least one of a two-dimensional virtual world, a 2.5-dimensional virtual world, and a three-dimensional virtual world. Classified according to a world type, the virtual world may be any one of a virtual forest world, a virtual ocean world, a virtual aquarium world, a virtual space world, a virtual animation and comic world, and a virtual fantasy world.

The virtual character may be stored locally in a form of a material library; or may be provided by a server for an APP. For example, the server provides virtual characters of n voice messages for the APP through a web page file. In other words, in addition to that the APP determines a virtual character corresponding to each voice message by itself by using a local material library, the server may also transmit a virtual character corresponding to each voice message to the APP after determining the virtual character corresponding to the voice message. Optionally, the APP simultaneously receives n voice messages and virtual characters corresponding to the voice messages that are transmitted by the server.

Figure 8:
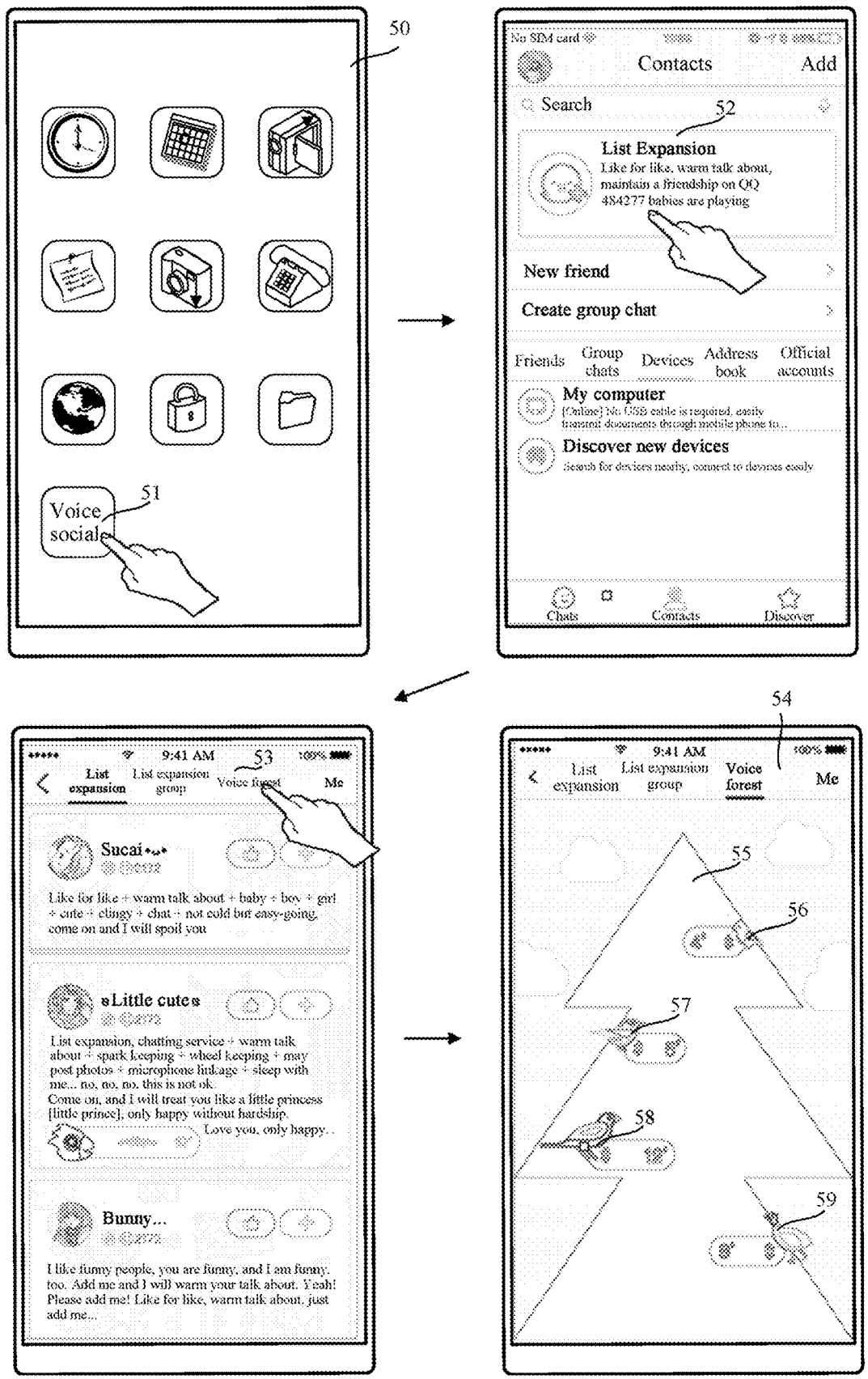
FIG. 8 is a schematic diagram of an interface of a voice message display method according to an exemplary embodiment of this application.

For step 603c, referring to FIG. 5 or FIG. 8 schematically, the voice message presentation interface 54 displays a scene screen of a virtual world "Voice forest", and the virtual world "Voice forest" is a two-dimensional world. There is a blue sky and white cloud background and a tree 55 located in the blue sky and white cloud background in the virtual world "Voice forest". There are four birds standing in the tree 55, and the four birds respectively correspond to: a voice message 56 published by a user A, a voice message 57 published by a user B, a voice message 58 published by a user C, and a voice message 59 published by a user D. Optionally, the four birds have different bird character images, and the user can quickly distinguish different voice messages according to the birds having four different character images. The "different voice messages" herein refer to voice messages that do not belong to the same voice message, and may be different voice messages transmitted by different users or different voice messages transmitted by the same user.

Optionally, the tree 55 includes three triangles vertically overlapping each other, the second triangle and the third triangle from top to bottom have the same shape and the same size, and the first triangle located at the top is slightly smaller than the other two triangles. A voice message corresponding to the first bird 56 is displayed to the right of the first triangle, voice messages corresponding to the second bird 57 and the third bird 58 are displayed to the left of the second triangle in a superposed manner, and a voice message corresponding to the fourth bird is displayed to the right of the third triangle in a superposed manner.

Optionally, each voice message is represented by using a message box, and the message box may be a rectangular box, a rounded rectangular box, a bubble box, a cloud box, or any other box. A length of the message box is in proportion to a message length of the voice message. The message length of the voice message may alternatively be displayed by using text above the message box. For example, a number "4" represents that the message length is 4 seconds, and a number "8" represents that the message length is 8 seconds. Optionally, the message box and the virtual character are displayed adjacently. When the virtual character is located to the left of a triangle, the message box is located to the right of the virtual character; and when the virtual character is located to the right of the triangle, the message box is located to the left of the virtual character. When a trigger operation is received on the voice message and/or a corresponding virtual character, a terminal plays corresponding message content.

In some embodiments, the terminal displays the voice message presentation interface in a multi-layer superposition and rendering manner Using an example in which the virtual world is a virtual forest world, the terminal renders an ambient atmosphere layer, a background visual layer, and a voice element layer separately, and superposes the ambient atmosphere layer, the background visual layer, and the voice element layer as the voice message presentation interface for display. The ambient atmosphere layer includes sky and ground in the virtual forest world, the background visual layer includes a tree in the virtual forest world, and the voice element layer includes a virtual character (for example, a bird) and a voice message corresponding to the virtual character. In a schematic example shown in FIG. 9, the terminal renders an ambient atmosphere layer 181, a background visual layer 182, and a voice element layer 183 separately. The background visual layer 182 is located above the ambient atmosphere layer 181, and the voice element layer 183 is located above the background visual layer 182.

Optionally, the ambient atmosphere layer 181 includes the sky in the virtual forest world, and the sky includes a blue sky background and a plurality of cloud patterns. The ambient atmosphere layer 181 further includes the ground in the virtual forest world, and the ground includes a lawn.

Additionally, the tree in the background visual layer 182 can include a plurality of triangles vertically overlapping each other, and each triangle is used for displaying a virtual character and a voice message corresponding to the virtual character. Therefore, a quantity of the triangles and a quantity of the voice messages are the same. In other words, a quantity of the triangles and a quantity of the birds are the same.

Optionally, a quantity of virtual characters in the voice element layer 183 and a quantity of voice messages obtained by the terminal are the same, and a display parameter of the virtual character is related to a message attribute of the corresponding voice message.

Schematically, when a quantity of the voice messages in the voice message presentation interface changes or is refreshed, the terminal may maintain the ambient atmosphere layer unchanged, redraw the background visual layer and the voice element layer according to a quantity of voice messages after the change, and then generate a new voice message presentation interface for refreshing and display after the ambient atmosphere layer, the background visual layer, and the voice element layer are superposed.

In step 604, the method can receive a trigger operation of at least one of the virtual character and the voice message in the voice message presentation interface, the trigger operation including at least one of a click operation and a slide operation.

In the voice message presentation interface, in addition to that the voice message may be clicked to be played, the virtual character is further used for playing corresponding message content when being triggered. The same voice message presentation interface may display a plurality of virtual characters, and a target virtual character is one of the plurality of virtual characters. The user triggers the target virtual character to play a voice message corresponding to the target virtual character.

In some embodiments, the user may click the virtual character, and when the virtual character is clicked, a voice message corresponding to the virtual character is triggered to be played. In some other embodiments, the user may slide the virtual character, and when the virtual character is slid, a voice message corresponding to the virtual character is triggered to be played.

In step 605, the method can play a voice message corresponding to the virtual character according to a trigger signal. The terminal plays the voice message according to the trigger signal. In a playback process, the user may trigger the virtual character again to suspend playback of the voice message, or replay the voice message.

The foregoing step 604 and step 605 are optional steps, depending on the operations performed by the user on the voice message presentation interface.

In conclusion, according to the method provided in this embodiment, a voice message presentation interface of an APP is displayed, and a voice message in a virtual world is displayed in the voice message presentation interface, and the voice message is displayed by using a visible element in the virtual world as a carrier. Because visible elements in the virtual world may be different, and types of the visible elements may also be diversified, this technical solution can resolve problems in the related art: presentation effects of voice messages on an interface are basically the same, and it is difficult for a user to accurately distinguish voice messages.

In some possible embodiments, for the foregoing step 603a, when determining virtual characters respectively corresponding to the n voice messages in the virtual world, the APP may determine a virtual character corresponding to the voice message according to a message attribute of the voice message.

In an embodiment, the message attribute includes a message content length of the voice message. The message content length refers to a duration required for normally playing message content of the voice message. The terminal determines a character parameter of the virtual character corresponding to the voice message according to the message content length of the voice message. The character parameter includes at least one of a type, an animation style, an animation frequency, and a special character effect of a character model. The type of the character model refers to a character model with different external forms, for example, a sparrow and a peacock; the animation style refers to different animations made by using the same character model, for example, raising the head, shaking the legs, spreading the wings, and wagging the tail; and the special character effects refer to different special effects of the same character model during display, for example, different feather colors and different appearances.

Figures 9, 10:
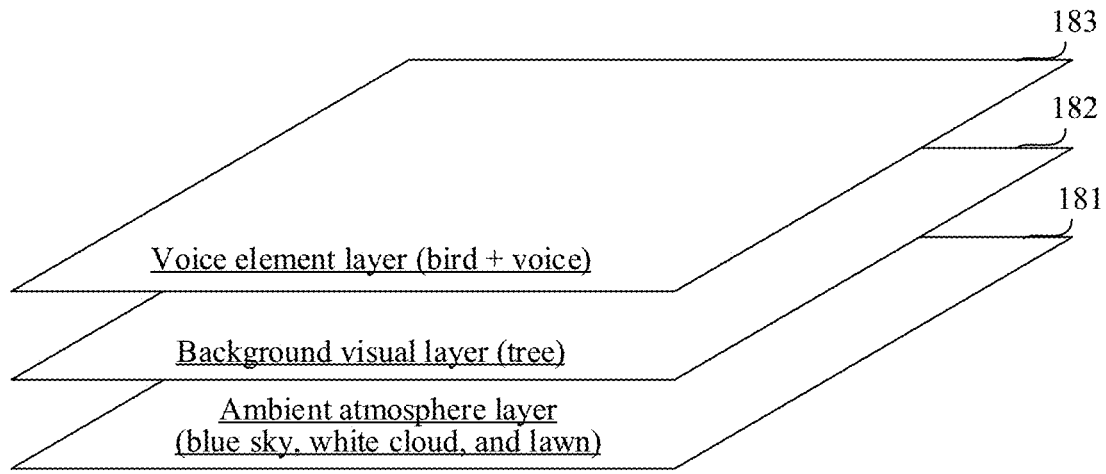
FIG. 9 is a schematic diagram of layering of a voice message display method according to an exemplary embodiment of this application.
FIG. 10 is a diagram of a correspondence between a character model of a bird and a message duration according to an exemplary embodiment of this application.

In a schematic example shown in FIG. 10, a plurality of different message content length ranges are preset in the APP, and the message content length ranges correspond to different character models respectively. For example, five different message content length ranges are set: a range A of "1-2 seconds", a range B of "2-5 seconds", a range C of "5-10 seconds", a range D of "10-30 seconds", and a range E of "more than 30 seconds". The range A corresponds to a bird A, the range B corresponds to a bird B, the range C corresponds to a bird C, the range D corresponds to a bird D, and the range E corresponds to a bird E. When a message content length of a voice message is 20 seconds, the terminal determines a virtual character corresponding to the voice message as the bird D; and when a message content length of a voice message is 35 seconds, the terminal determines a virtual character corresponding to the voice message as the bird E.

In another embodiment, the message attribute includes a published duration of the voice message. The published duration is a duration of timing starting from an upload time of the voice message. The terminal determines a character parameter of the virtual character corresponding to the voice message according to the published duration of the voice message.

Figure 11:
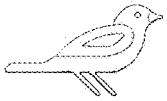
FIG. 11 is a diagram of a correspondence between a character model of a bird and a published duration according to an exemplary embodiment of this application.
Figure 11:
Figure 11:
Figure 11:
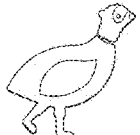
Figure 11:
Figure 11:
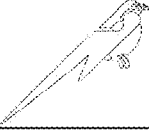

In a schematic example shown in FIG. 11, a plurality of different published duration ranges are preset, and the published duration ranges correspond to different character models respectively. For example, six different published duration ranges are preset: a range 1 of "<1 minute", a range 2 of "1 minute to 30 minutes", a range 3 of "30 minutes to 1 hour", a range 4 of "1 hour to 4 hours", a range 5 of "4 hours to 24 hours", and a range 6 of "more than 24 hours". The range 1 corresponds to a bird 1, the range 2 corresponds to a bird 2, the range 3 corresponds to a bird 3, the range 4 corresponds to a bird 4, the range 5 corresponds to a bird 5, and the range 6 corresponds to a bird 6. When a published duration of a voice message is 10 minutes, the terminal determines a virtual character corresponding to the voice message as the bird 2; and when a published duration of a voice message is 4 hours and 11 minutes, the terminal determines a virtual character corresponding to the voice message as the bird 5.

In another embodiment, the message attribute includes an unplayed duration of a voice message in an unplayed state after the voice message is displayed. The unplayed duration refers to a duration of a voice message starting from a display start moment to a current moment, the display start moment being a moment at which the voice message starts to be displayed in the voice message presentation interface. The terminal determines a character parameter of the virtual character corresponding to the voice message according to the unplayed duration of the voice message. For example, a plurality of different unplayed duration ranges are preset, and the unplayed duration ranges correspond to different character models respectively.

Optionally, there are different character parameters corresponding to at least two different message attributes. In both of the foregoing two examples, descriptions are provided by using an example in which the character parameter is a type of the character model. In different embodiments, the animation style and/or the special character effect of the virtual character may alternatively be determined according to the message attribute of the voice message. For example, the terminal determines a character feature of the virtual character according to the published duration of the voice message, and a longer published duration of the voice message indicates a larger and brighter halo around the virtual character.

In other embodiments, the message attribute may include a gender attribute, for example, a male voice or a female voice of the voice message, an age attribute, for example, under 18 years old, 18-25 years old, 25-30 years old, 30-35 years old, and over 35 years old of the voice message, and a category classification, for example, a childlike voice, a loli voice, an uncle voice, and a magnetic male voice of the voice message. Of course, it should be understood that the attribute included in the message attribute is not limited in this embodiment.

Figure 12:
FIG. 12 is a diagram of a correspondence between a character model of a bird and a published duration according to another exemplary embodiment of this application.
Figure 12:
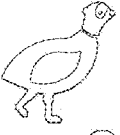
Figure 12:
Figure 12:
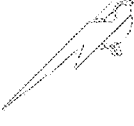

In different embodiments, duration ranges may divided differently. For example, for the published duration, four different duration ranges are divided as "1-5 seconds", "6-10 seconds", "10-30 seconds", and "30-60 seconds". There may be two or more virtual characters corresponding to the same duration range, for example, as shown in FIG. 12, each range corresponds to character models of three different birds. In this case, for a voice message corresponding to one duration range, a character model may be randomly selected from a plurality of character models corresponding to the duration range as a character model corresponding to the voice message.

In conclusion, according to the method provided in this embodiment, a virtual character corresponding to a voice message is determined according to a message attribute of the voice message, so that when observing different virtual characters, a user can learn of a message attribute of a voice message corresponding to the virtual character at the same time, and the message attribute may be any one of a message content length, a published duration, and an unplayed duration. Therefore, information related to a voice message is transmitted to the user by using graphical elements while reducing, as far as possible, text information read by the user.

In some possible embodiments, after playing message content of a voice message in the voice message presentation interface 54, the user may further establish a friend relationship with a user publishing the voice message, or add the voice message to a favorites list.

Figure 13:
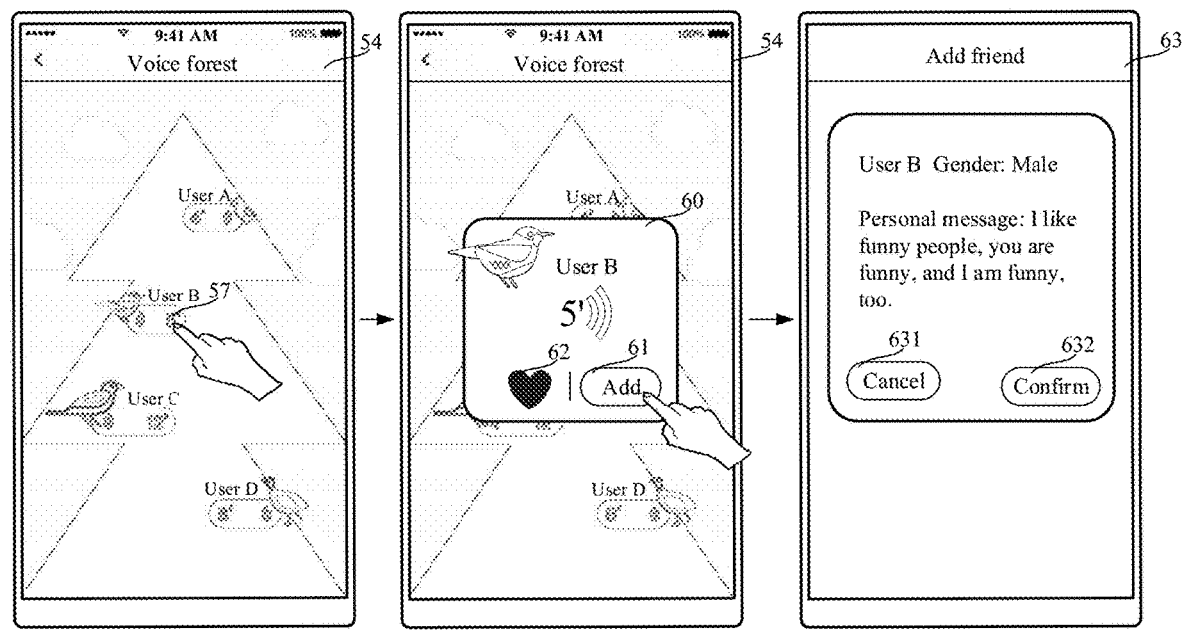
FIG. 13 is a flowchart of a voice message display method according to another exemplary embodiment of this application.
Figure 14:
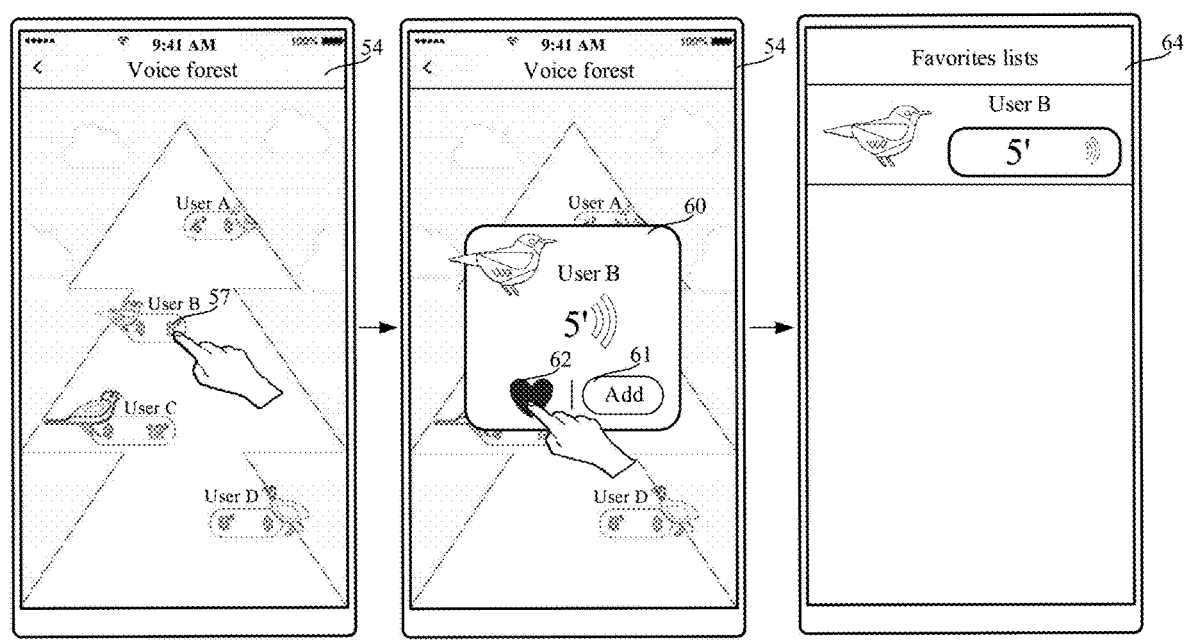
FIG. 14 is a schematic diagram of an interface of a voice message display method according to another exemplary embodiment of this application.
Figure 15:
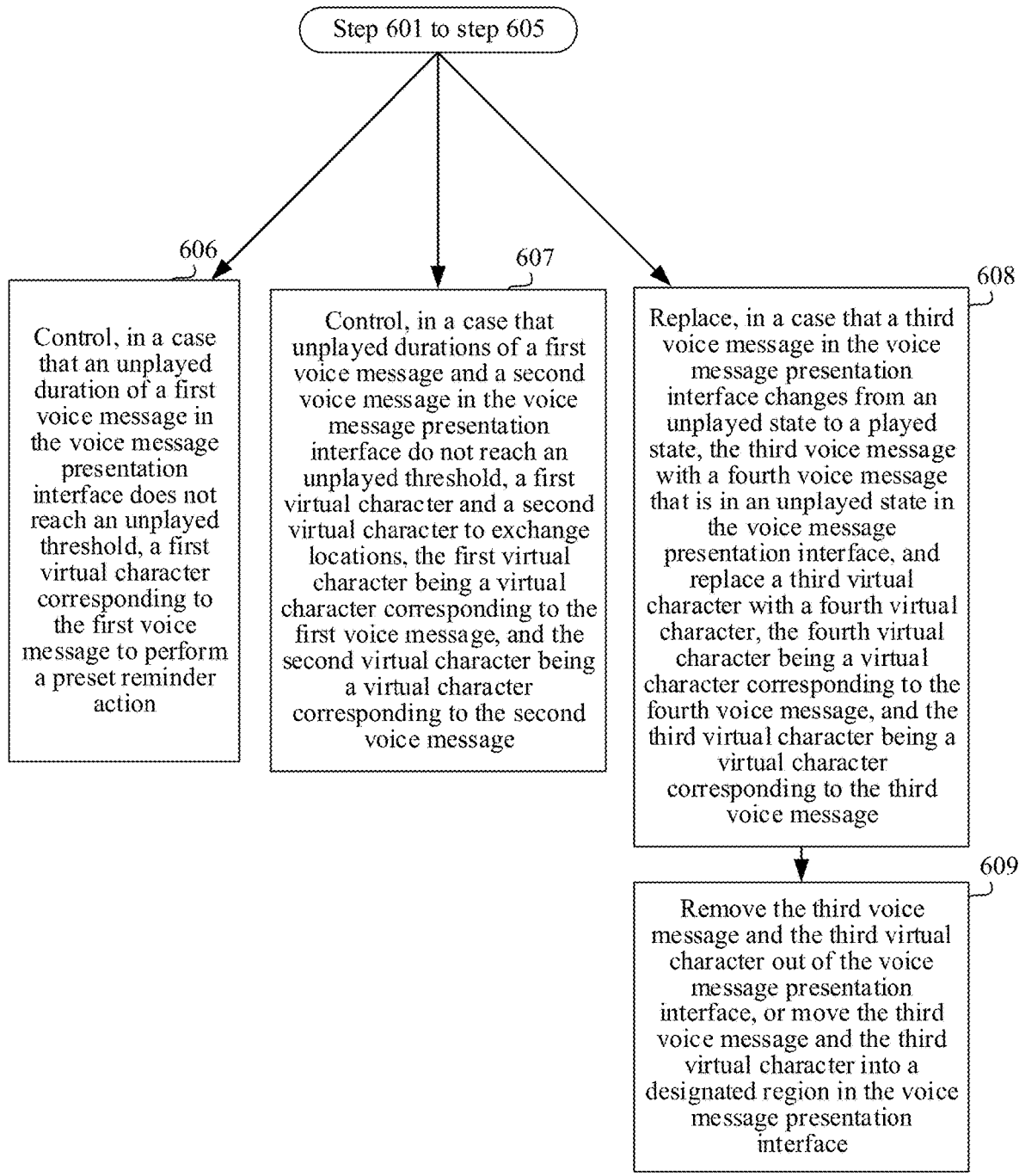
FIG. 15 is a schematic diagram of an interface of a voice message display method according to another exemplary embodiment of this application.

With reference to FIG. 13 or FIG. 14, when the user wants to play a voice message 57 published by a user B in the voice message presentation interface 54, the user performs a trigger operation on the virtual character or the voice message 57, and the trigger operation may be a click operation or a slide operation. The terminal displays a playback window 60 of the voice message 57 according to the trigger operation, and a friend-add control 61 and a favorite control 62 corresponding to the virtual character are displayed at the play window 60.

For a friend adding process, the APP displays a friend-add control corresponding to the virtual character, and the user may perform a first operation on the friend-add control when the user wants to add a message publisher that the user is interested in. The APP receives the first operation acting on the friend-add control, and when the friend-add control is represented by using a friend-add button, the first operation may be a click operation acting on the friend-add button, and the APP establishes a friend relationship with a user account corresponding to the virtual character according to the first operation. In a schematic example shown in FIG. 13, the friend-add control 61 may be an "Add friend" button 61. The "Add friend" button 61 is configured to establish a friend relationship between a current user and a user B. When the "Add friend" button 61 is clicked, the terminal may jump to a friend-add page 63, and then the user adds a friends at the friend-add page 63. Optionally, the friend-add page 63 displays a "Confirm" button 632 and a "Cancel" button 631. The friend-add control 61 may alternatively be displayed in another manner, for example, be displayed near a virtual character in the voice message presentation interface 54 in a form of a mini pull-down menu, and this is not limited in this embodiment.

The APP interacts with the server according to the first operation, and establishes a friend relationship with a user account corresponding to the virtual character through the server. In some embodiments, the user is further required to input verification information when establishing a friend relationship, and establish a friend relationship with a user account corresponding to the virtual character after the verification information is successfully verified by the user account.

For a process of adding a voice message to favorites, the APP displays a favorite control corresponding to the virtual character, and the user may perform a second operation on the favorite control when the user wants to add a voice message that the user is interested in to favorites. The APP receives the second operation acting on the favorite control, and the second operation may be a click operation acting on the favorite control. The APP adds a voice message corresponding to the virtual character to favorites according to the second operation. In a schematic example shown in FIG. 14, the favorite control 62 is implemented by using a heart-shaped button. The favorite control 62 is configured to add a voice message corresponding to the virtual character to favorites. When the favorite control 62 is clicked, the terminal may jump to a "Favorites list" page 64, and the "Favorites list" page 64 displays all voice messages that have been added by the user to favorites, then the user may repeatedly listen to the voice messages that have been added to favorites at the page.

Optionally, compared with a voice message that has not been added to favorites, the terminal adopts a distinctly displaying manner for a virtual character corresponding to a voice message that has been added to favorites, and the distinctly displaying manner includes: at least one of changing a color, adding an accessory, and adding a special animation effect. For example, a hat or heart-shaped mark is displayed above a bird corresponding to the voice message that has been added to favorites.

In conclusion, according to the method provided in this embodiment, a voice message corresponding to a virtual character is triggered to be played through a trigger signal acting on the virtual character, so that a user may directly use the virtual character as a character for man-machine interaction, and a sense of immersion in the virtual world is improved when the voice message is played, thereby improving man-machine interaction efficiency during man-machine interaction.

According to the method provided in this embodiment, further, in a case that a voice message presentation interface displays a voice message of an unfamiliar user account, a friend-add control is displayed when the voice message is played, so that the user may directly establish a friend relationship with an unfamiliar user account when hearing a voice message that the user is interested in, thereby adding a friend addition rate between interested users in a social APP.

According to the method provided in this embodiment, further, a favorite control is displayed in the voice message presentation interface, so that the user adds, in a case of hearing a voice message that the user is interested in, the voice message into a favorites list, to repeatedly listen to the voice message in a later time.

The voice message displayed in the voice message presentation interface 54 may not be clicked to be played by the user timely. In some possible embodiments, to help the user distinguish a voice message that has been displayed but is not played (referred to as an unplayed voice message for short) from a played voice message. After the foregoing step 605, step 606 to step 609 are further included below, as shown in FIG. 16.

In step 606, the method can control, in a case that an unplayed duration of a first voice message in the voice message presentation interface does not reach an unplayed threshold, a first virtual character corresponding to the first voice message to perform a preset reminder action. The preset reminder action includes, but is not limited to: at least one of shaking the entire body, shaking the head, shaking the limbs, twittering, and pecking feathers. Optionally, shaking the entire body refers to shaking a character model left and right and/or up and down by using the character model as a central point.

Figure 16:
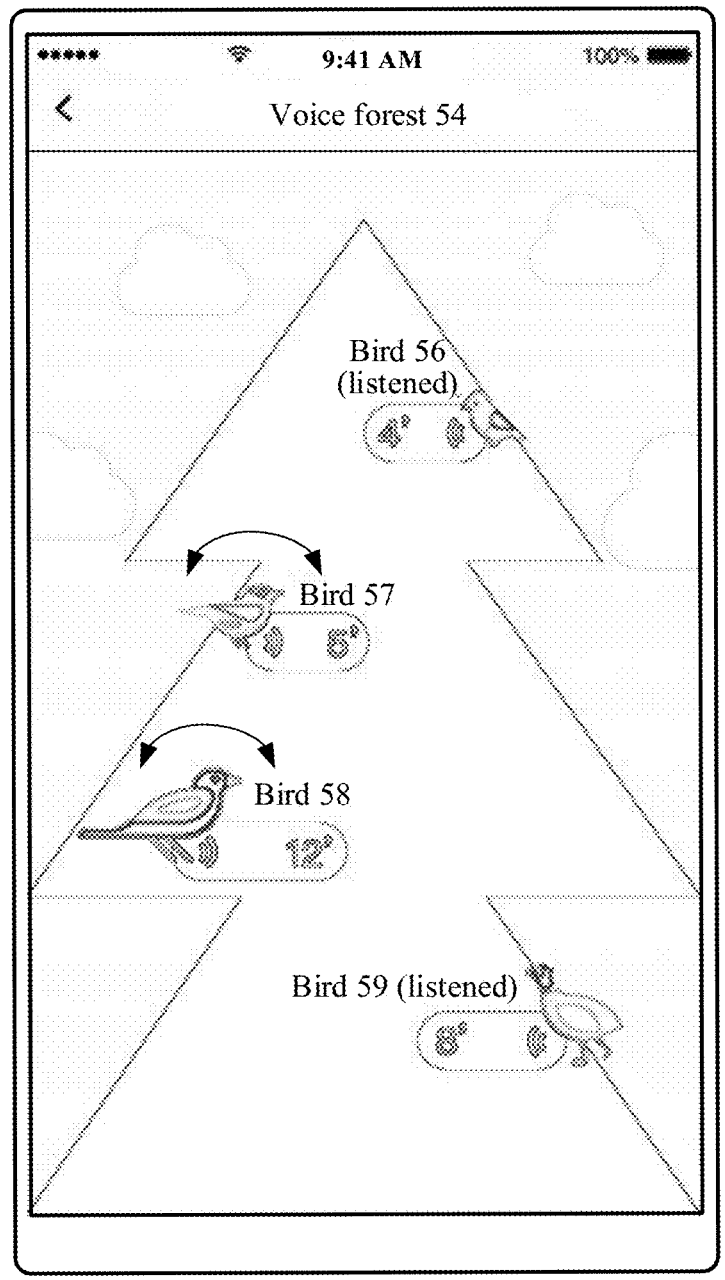
FIG. 16 is a schematic diagram of an interface of a voice message display method according to another exemplary embodiment of this application.

Using an example in which the virtual character is a bird, as shown in FIG. 16, when unplayed durations of voice messages corresponding to a bird 57 and a bird 58 in the voice message presentation interface reach 10 seconds, the terminal controls the bird 57 and the bird 58 to shake their bodies, to prompt the user that the voice messages corresponding to the bird 57 and the bird 58 are unplayed voice messages.

Optionally, the mechanism may be executed periodically. For example, an unplayed threshold is 10 seconds. If a voice message corresponding to the first virtual character is in an unplayed state all the time, the terminal controls the first virtual character corresponding to the first voice message to shake the body every 10 seconds.

In step 607, the method can control, in a case that unplayed durations of a first voice message and a second voice message in the voice message presentation interface do not reach an unplayed threshold, a first virtual character and a second virtual character to exchange locations, the first virtual character being a virtual character corresponding to the first voice message, and the second virtual character being a virtual character corresponding to the second voice message.

Optionally, the first virtual character and the second virtual character are any two virtual characters displayed in the voice message presentation interface. When there are a plurality of voice messages whose unplayed durations do not reach the unplayed threshold, the first voice message and the second voice message may be two voice messages having the closest locations in the voice message presentation interface.

Figure 17:
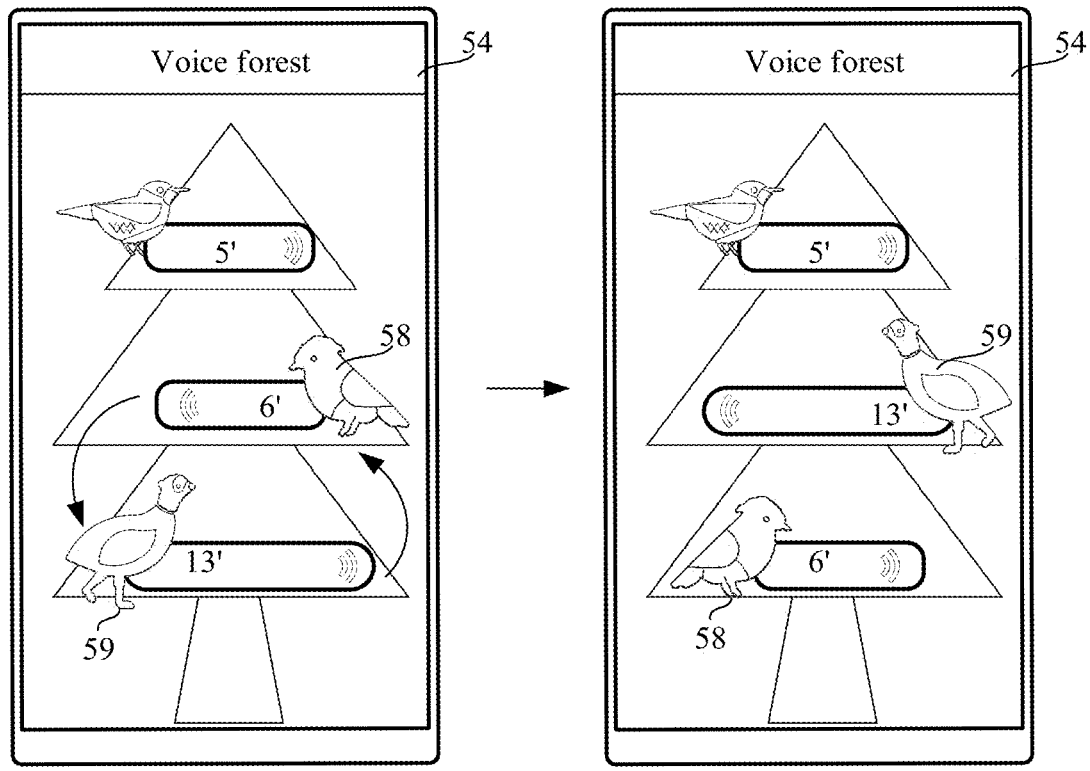
FIG. 17 is a schematic diagram of an interface of a voice message display method according to another exemplary embodiment of this application.

Referring to FIG. 17, three voice messages are displayed in a voice message presentation interface 40. Assuming that a voice message located at the top of a tree is a played voice message, and a first voice message 51 and a second voice message 52 located at the middle and lower parts of the tree are unplayed voice messages, then when unplayed durations of the unplayed voice messages reach the unplayed threshold, a bird corresponding to the first voice message 51 and a bird corresponding to the second voice message 52 are controlled to exchange locations.

In step 608, the method can replace, in a case that a third voice message in the voice message presentation interface changes from an unplayed state to a played state, the third voice message with a fourth voice message that is in an unplayed state in the voice message presentation interface, and replace a third virtual character with a fourth virtual character, the fourth virtual character being a virtual character corresponding to the fourth voice message, and the third virtual character being a virtual character corresponding to the third voice message.

Optionally, the fourth voice message is a voice message obtained newly, and the fourth virtual character is a virtual character determined according to the fourth voice message. The fourth voice message is a voice message that has not been displayed.

In step 609, the method can remove the third voice message and the third virtual character out of the voice message presentation interface, or move the third voice message and the third virtual character into a designated region in the voice message presentation interface. In a possible embodiment, when the terminal replaces the third virtual character with the fourth virtual character, the terminal may remove the third virtual character out of the voice message presentation interface. For example, if the third virtual character is a bird, then the bird may fly out of the voice message presentation interface. In another possible embodiment, when the terminal replaces the third virtual character with the fourth virtual character, the terminal may move the third virtual character into a designated region in the voice message presentation interface. For example, if the third virtual character is a bird, then the bird may fly to a lawn under a tree in the virtual forest world.

Step 606 may be independently implemented as an embodiment, step 607 may be independently implemented as an embodiment, and step 608 and step 609 may be independently implemented as an embodiment.

In conclusion, according to the method provided in this embodiment, a third voice message changes from an unplayed state to a played state, and the third voice message is replaced with a fourth voice message that is in an unplayed state, so that a voice message presentation interface may automatically add and display an unplayed voice message, to help a user clearly distinguish a played voice message and an unplayed voice message and play the unplayed voice message more conveniently, thereby improving efficiency of man-machine interaction between the user and the terminal.

According to the method provided in this embodiment, when an unplayed duration of a first voice message does not reach an unplayed threshold, a first virtual character corresponding to the first voice message is controlled to perform a preset reminder action, so that a user can distinguish a played voice message and an unplayed voice message in a voice message presentation interface, to preferentially control the unplayed voice message for playback.

Further, according to the method provided in this embodiment, when unplayed durations of a first voice message and a second voice message do not reach an unplayed threshold, a first virtual character and a second virtual character are controlled to exchange locations in a voice message presentation interface, so that a user can distinguish a played voice message and an unplayed voice message in the voice message presentation interface, to preferentially control the unplayed voice message for playback.

Figure 18:
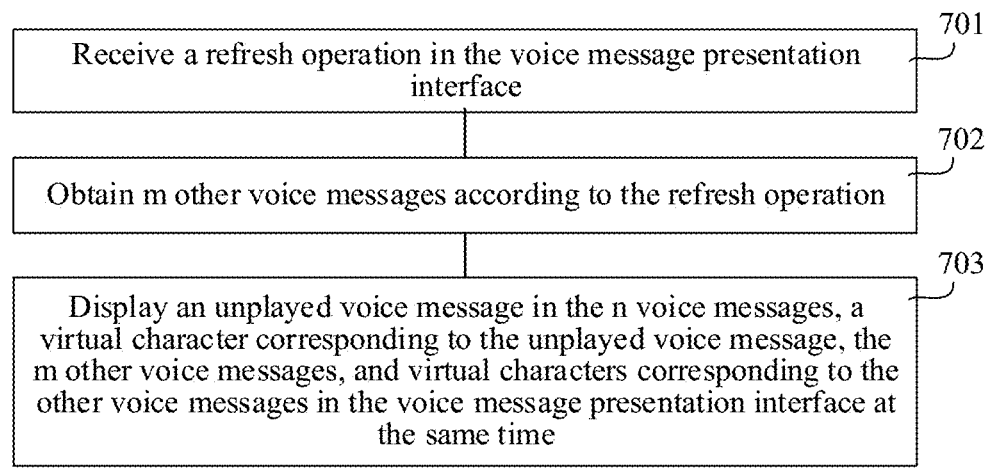
FIG. 18 is a flowchart of a voice message display method according to another exemplary embodiment of this application.

A quantity of voice messages displayed in the voice message presentation interface 54 is limited, and is, for example, 4, 6, or 8. In some possible embodiments, a user has a requirement for refreshing and displaying the voice message presentation interface 54. After the foregoing step 603, the following steps are further included below, as shown in FIG. 18.

In step 701, the method can receive a refresh operation in the voice message presentation interface. The refresh operation includes, but is not limited to, a pull-down operation and/or a pull-up operation. For example, the terminal is a touch screen, and the user pulls down the voice message presentation interface on the touch screen, or pulls up the voice message presentation interface on the touch screen.

In step 702, the method can obtain m other voice messages according to the refresh operation. The terminal obtains m other voice messages from the server according to the refresh operation, m being a positive integer. Optionally, the other voice messages are voice messages published by at least one user account between the last obtaining of a voice message and a current moment. Alternatively, the other voice messages are voice messages sifted from a voice message library by the server according to a sifting condition.

In step 703, the method can display an unplayed voice message in the n voice messages, a virtual character corresponding to the unplayed voice message, the m other voice messages, and virtual characters corresponding to the other voice messages in the voice message presentation interface at the same time.

When the user performs the refresh operation, it indicates that the user wants to view new voice messages. The terminal displays the unplayed voice message in the n voice messages and m other voice messages in the voice message presentation interface at the same time. That is, the terminal preferentially displays an unplayed voice message.

Using an example in which the virtual world is a virtual forest world, and the virtual character is a bird in a tree in the virtual forest world, there are at least two different implementations in step 703.

First, the n voice messages are all unplayed voice messages. A scene screen of the virtual forest world is displayed in the voice message presentation interface, the scene screen including a tree located in the virtual forest world, the m other voice messages being displayed on an upper part of the tree, and the unplayed voice message in the n voice messages and the virtual character corresponding to the unplayed voice message being displayed on middle and lower parts of the tree.

Optionally, the terminal determines a height of the tree according to a first message quantity of the unplayed voice messages in the n voice messages and a second message quantity of the m other voice messages. A sum of the first message quantity and the second message quantity is positively correlated to the height of the tree.

Figure 19:
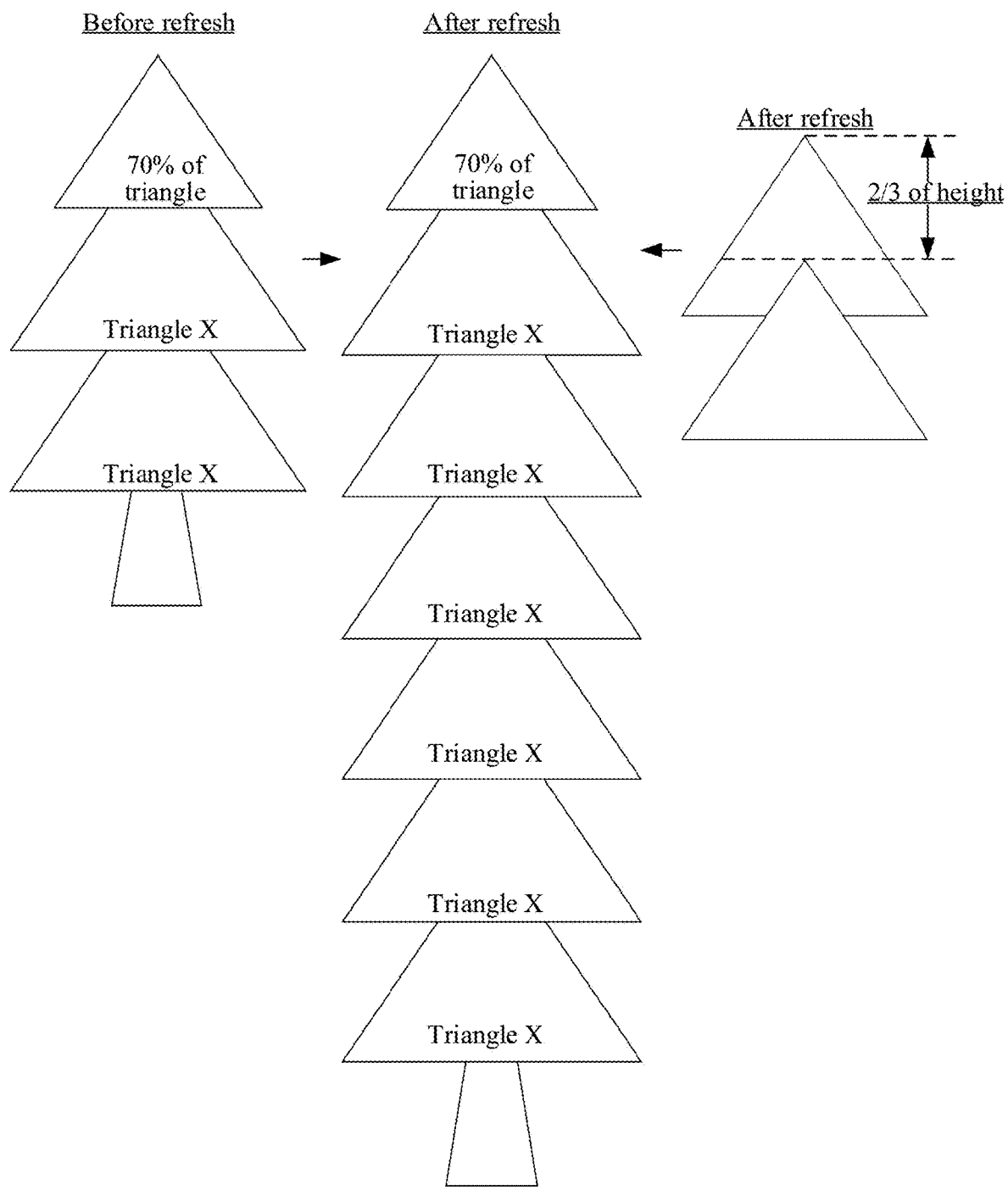
FIG. 19 is a schematic diagram of an interface of a voice message display method according to another exemplary embodiment of this application.

Referring to FIG. 19, the tree in the virtual forest world is formed by overlapping a plurality of triangles. Sizes of triangles located in the middle part of the tree are the same, and a size of a triangle located at the top of the tree is 70% of the sizes of the triangles in the middle part of the tree. In a possible embodiment, each triangle is used for displaying a bird and a voice message corresponding to the bird, and virtual characters on triangles that are vertically adjacent alternate left and right. In other words, when k voice messages need to be displayed, the tree needs to have k triangles. Because in this step, m other voice messages are obtained newly, and n voice messages before refreshing are all unplayed voice messages, m triangles needs to be added.

Optionally, when a triangle needs to be added, the terminal copies a triangle x located at the bottom of the tree as a unit, and translates the copied triangle down by ⅔ of the height. Because the m other voice messages are voice messages obtained newly, the terminal may display the m other voice messages on an upper part of the tree, and the n voice messages obtained before the refreshing are displayed on middle and lower parts of the tree.

Second, some voice messages in the n voice messages are unplayed voice messages, and the remaining voice messages are played voice messages. After the user listens to some voice messages in the n voice messages, if the user performs a refresh operation, the terminal may cancel, when displaying the m other voice messages and the unplayed voice messages in the n other voice messages, displaying of the played voice messages in the n voice messages, and cancel displaying of virtual characters corresponding to the played voice messages.

In some embodiments, because the user has a requirement for repeatedly listening to the played voice messages, when the terminal displays the m other voice messages and the unplayed voice messages in the n voice messages, the terminal may display the virtual characters corresponding to the played voice messages in the n voice messages on a lawn under the tree.

Figure 20:
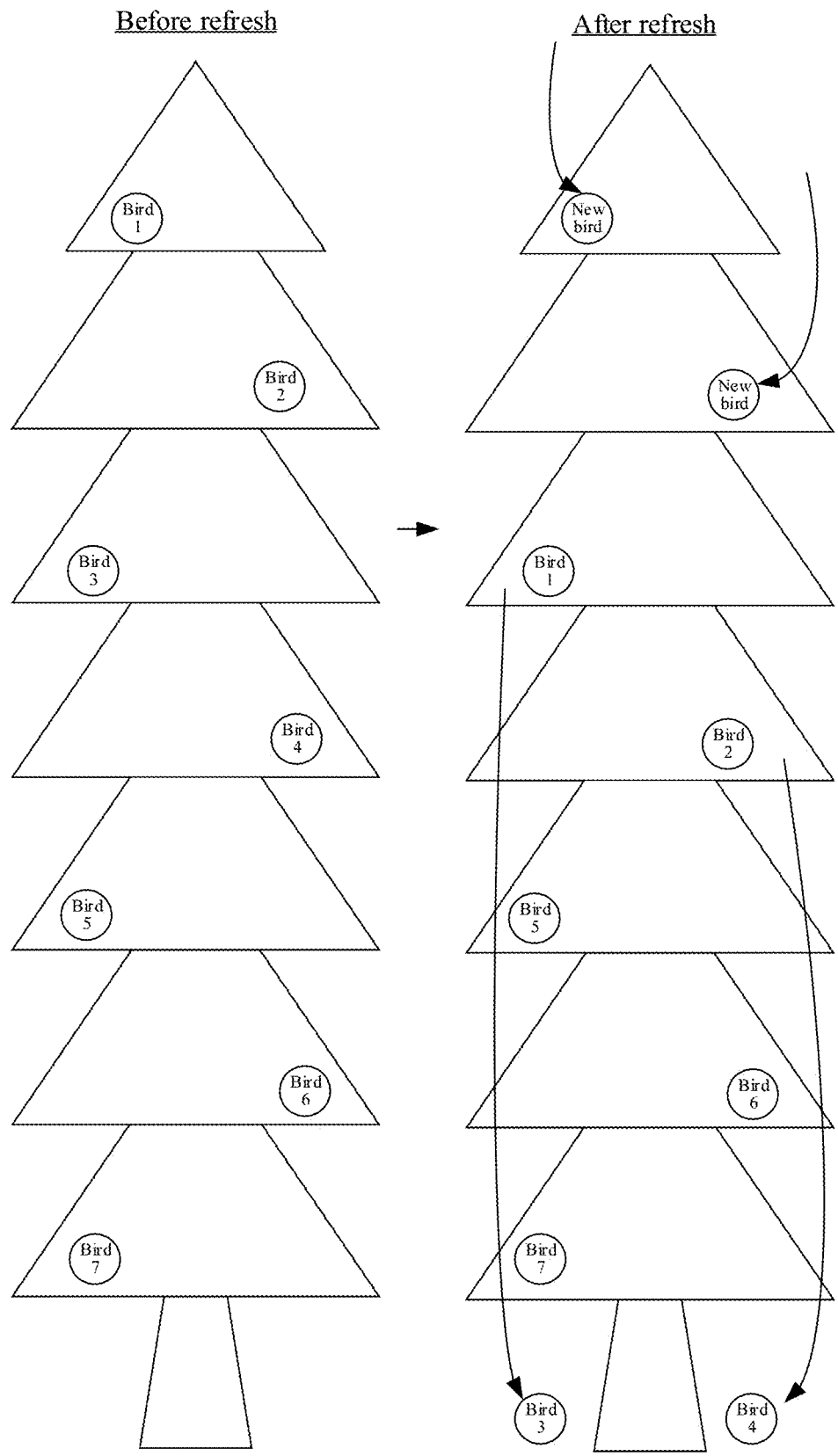
FIG. 20 is a schematic diagram of an interface of a voice message display method according to another exemplary embodiment of this application.

Referring to FIG. 20, assuming that the user has listened to voice messages corresponding to a bird 3 and a bird 4, when two new birds are obtained through refreshing, the two new birds are displayed at the top of the tree, and a bird 1, a bird 2, a bird 5, a bird 6, and a bird 7 that are not played are moved down to and displayed on the middle and lower parts of the tree, and the played bird 3 and bird 4 are displayed on the lawn under the tree.

In conclusion, according to the method provided in this embodiment, when a refresh operation is received, m other voice messages are obtained according to the refresh operation, and a voice message presentation interface displays an unplayed voice message in n voice messages and the m other voice messages at the same time, so that the voice message presentation interface preferentially displays the unplayed voice messages during a refresh process, to help a user clearly distinguish a played voice message and an unplayed voice message, and the user intuitively listens to the unplayed voice messages in the tree after the refresh operation, thereby improving efficiency of man-machine interaction between the user and the terminal.

Figure 21:
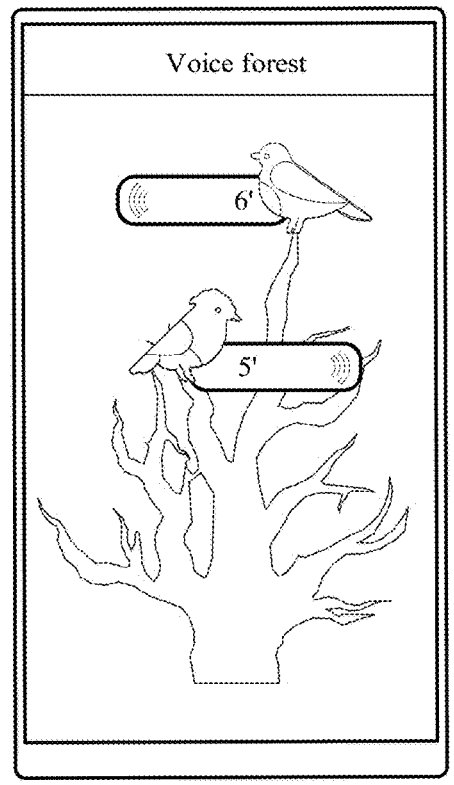
FIG. 21 is a flowchart of a voice message display method according to another exemplary embodiment of this application.
Figure 22:
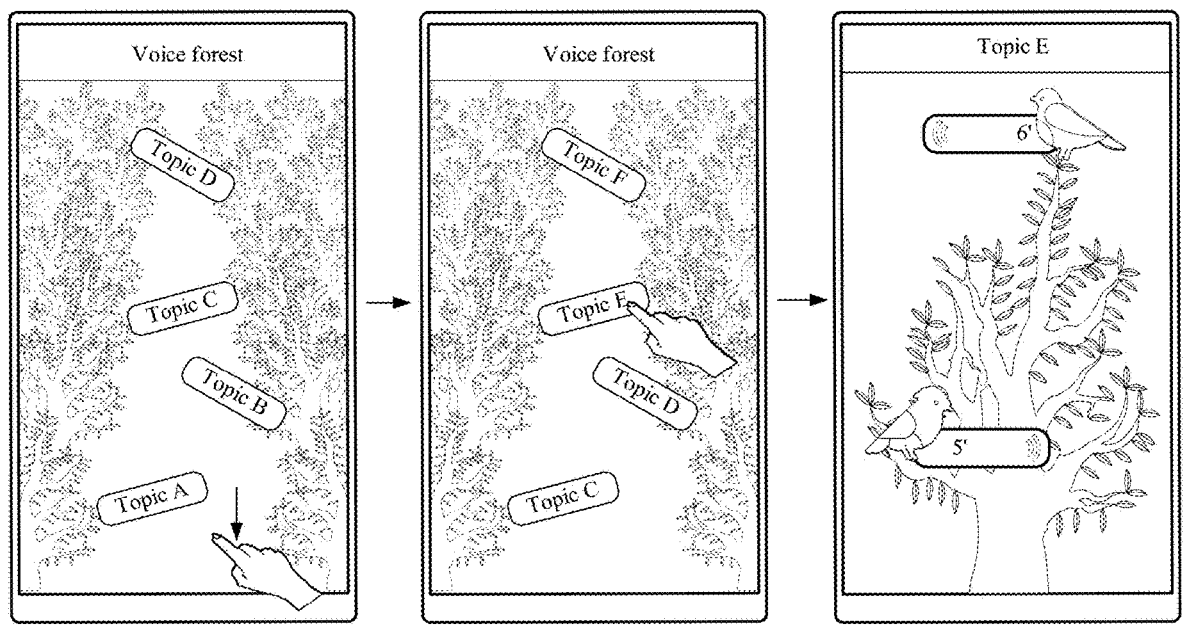
FIG. 22 is a flowchart of a voice message display method according to another exemplary embodiment of this application.
Figure 23:
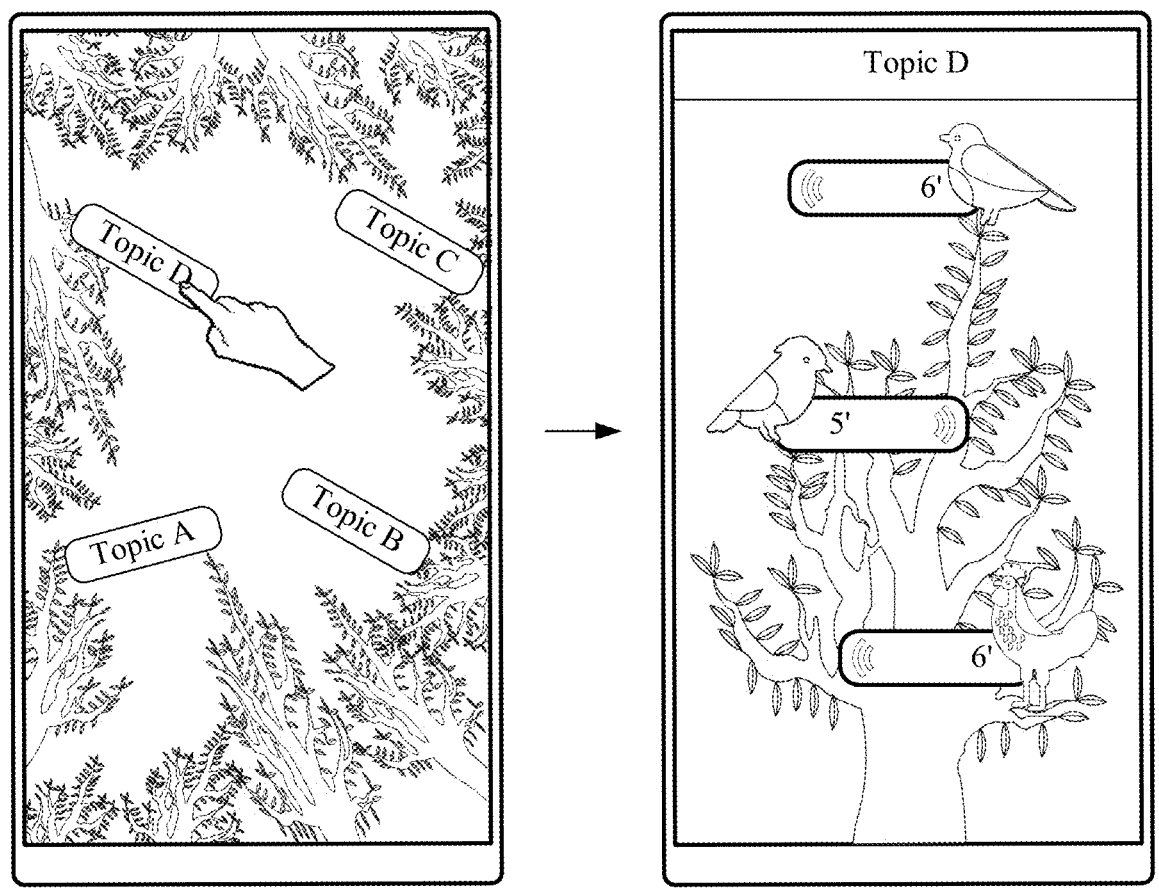
FIG. 23 is a schematic diagram of an interface of a voice message display method according to another exemplary embodiment of this application.

In the foregoing embodiments, descriptions are provided by using an example in which the tree in the virtual forest world is a tree formed by overlapping a plurality of triangles. In some embodiments, as shown in FIG. 21, the tree in the virtual forest world may alternatively be a tree with curved edges and a plurality of branches. In some other embodiments, as shown in FIG. 22, there may be a plurality of trees in the virtual forest world, and the trees represent different topics (or circles or themes), for example, a topic A, a topic B, a topic C, and a topic D. The user may also slide up or down to view another topic E and another topic F, and the user may select a tree corresponding to the "topic E", and then view a bird and a voice message in the tree. Voice messages in the tree belong to the same topic E. In some other embodiments, in addition to a corridor following-type tree arrangement manner shown in FIG. 22, and a three-dimensional surrounding-type thee arrangement manner shown in FIG. 23 may be further adopted. The trees in the virtual forest world are arranged and displayed annularly, and each tree corresponds to a topic. The tree arrangement manner in the virtual forest world is not limited in this embodiment of this application.

Figure 24:
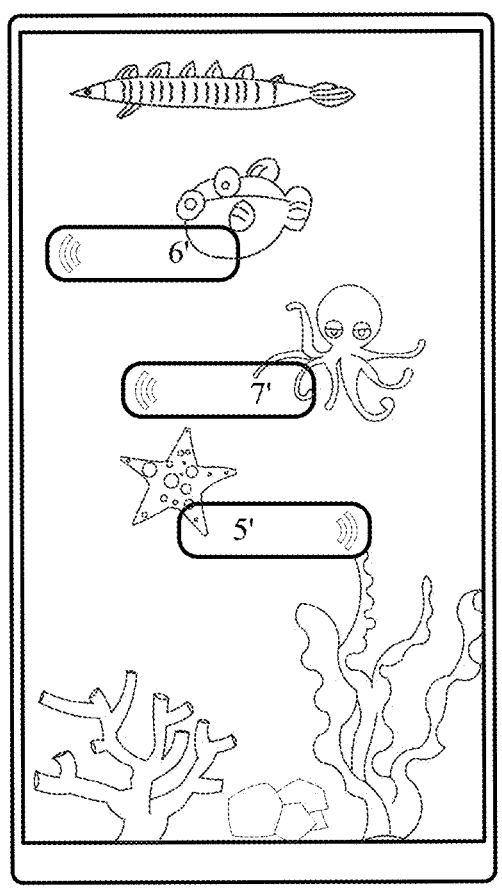
FIG. 24 is a schematic diagram of an interface of a voice message display method according to another exemplary embodiment of this application.

In all of the foregoing embodiments, descriptions are provided by using an example in which the virtual world is a virtual forest world, and the virtual character is a virtual bird. A specific form of the virtual world is not limited in this embodiment, but in other embodiments, as shown in FIG. 24, the virtual world may alternatively be a virtual ocean world, and the virtual character may be a virtual fish.

Figure 25:
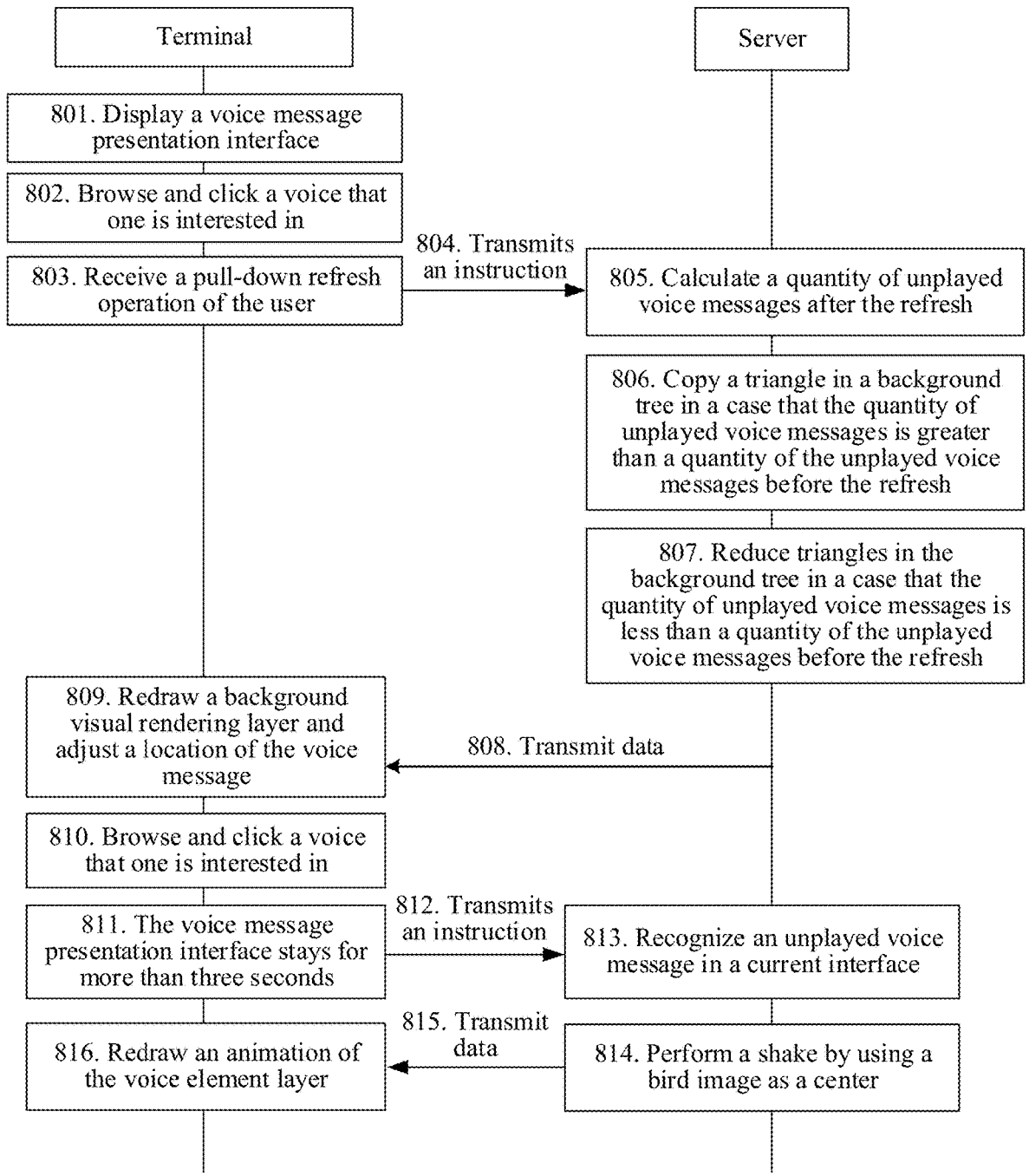
FIG. 25 is a flowchart of a voice message display method according to another exemplary embodiment of this application.

In some possible embodiments, as shown in FIG. 25, an example in which the APP is an instant messaging program, the voice message is a sub-function in the APP, the virtual world is a virtual forest world, and the virtual character is a bird is used.

In step 801, a terminal displays a voice message presentation interface. The voice message presentation interface is an interface provided by the instant messaging program. A user triggers a user operation on the instant messaging program, and the instant messaging program displays the voice message presentation interface according to the user operation.

Referring to FIG. 8, the instant messaging program provides a "list expansion" function 52 in a function list, and "list expansion" refers to expanding a friend list. When the user clicks the "list expansion" function 52, a list expansion function page is entered. The list expansion function page includes three tab pages: List expansion, List expansion group, and Voice forest. When the user clicks a "Voice forest" tab 53, the instant messaging program displays a voice message presentation interface "Voice forest". A "Voice forest" interface 54 displays a blue sky and white cloud background, a tree, and four birds in the tree.

Optionally, when the instant messaging program needs to display the "Voice forest" interface 54, the instant messaging program obtains n voice messages from the server. When the instant messaging program stores materials of virtual characters locally, the instant messaging program determines virtual characters corresponding to voice messages in the virtual world according to message attributes of the voice messages. When the instant messaging program does not store materials of virtual characters locally, the instant messaging program obtains virtual characters corresponding to voice messages in the virtual world from the server. Schematically, when the "Voice forest" interface 54 is implemented in a form of a web page, the server transmits the n voice messages, the virtual characters corresponding to the n voice messages, and the display materials of the virtual world to the instant messaging program together, and then the instant messaging program displays the voice message presentation interface according to the data.

Additionally, the n voice messages transmitted by the server to the terminal are sifted according to a preset condition. The preset condition includes, but is not limited to, at least one of the following conditions: 1. being a voice message of an unfamiliar user account of a current user account; 2. having a gender from that of the current user account; 3. having a user portraits the same as or similar to that of the user account; 4. a large quantity of times of adding a friend; and 5. a large quantity of times of being added as a friend. When there are two or more preset conditions, the voice messages may be scored according to a weight corresponding to each condition, and n voice messages are selected in descending order of scores and are pushed to the instant messaging program. Logic according to which the server provides n voice messages to the terminal is not limited in this embodiment.

In step 802, the terminal browses and clicks a voice that a user is interested in. When a quantity of the voice messages is relatively large and the tree is relatively high, a "Voice forest" interface 73 preferentially displays a top end part of the tree. The user may view middle and lower parts of the tree and a lawn under the tree in a sliding-up manner. When the "Voice forest" interface 73 displays a voice message that the user is interested in, if the user clicks the voice message, or clicks a virtual character corresponding to the voice message, then the instant messaging program plays the voice message.

In step 803, the terminal receives a pull-down refresh operation of a user. The user may further perform a pull-down refresh on the instant messaging program, and the pull-down refresh is a refresh operation of triggering a refresh by using a sliding-down signal. A specific form of a refresh operation is not limited in this embodiment, and the pull-down refresh is only used as an example. The instant messaging program obtains m other voice messages from the server according to the refresh operation.

In step 804, the terminal transmits an instruction to the server. The instant messaging program transmits a refresh instruction to the server.

Further, in step 805, the server calculates a quantity of unplayed voice messages after the refresh. The server selects m other voice messages for the terminal again. Then, the server determines a quantity of unplayed voice messages after the refresh according to a sum of the unplayed voice messages in the n voice messages before the refresh and the m other voice messages.

In step 806, the server copies a triangle in a background tree in a case that the quantity of unplayed voice messages is greater than a quantity of the unplayed voice messages before the refresh. Optionally, the tree in the virtual forest world is formed by overlapping a plurality of triangles, and one or more voice messages and a virtual character corresponding to the voice message are displayed on each triangle. The server copies the triangle in the background tree in a case that the quantity of the voice messages after the refresh is greater than the quantity of the messages before the refresh, to increase the height of the background tree. For this process, refer to FIG. 19 and FIG. 20.

In step 807, the server reduces triangles in the background tree in a case that the quantity of unplayed voice messages is less than a quantity of the unplayed voice messages before the refresh. The server reduces the quantity of the triangles in the background tree in a case that the quantity of the voice messages after the refresh is less than the quantity of the messages before the refresh, to reduce the height of the background tree.

In step 808, the server transmits data to the terminal. Optionally, the server transmits the m other voice messages to the terminal; and the server transmits the m other voice messages and the unplayed voice messages in the n voice messages before the refresh to the terminal. Alternatively, the server transmits the m other voice messages, the unplayed voice messages in the n voice messages before the refresh, and the played voice messages in the n voice messages before the refresh to the terminal.

Additionally, the server transmits m other voice messages and virtual characters corresponding to the other voice messages to the terminal. Alternatively, the server transmits m other voice messages and virtual characters corresponding to the other voice messages, unplayed voice messages in n voice messages before the refresh and virtual characters corresponding to the unplayed voice messages, and played voice messages in n voice messages before the refresh and virtual characters corresponding to the played voice messages to the terminal. Optionally, the server transmits the messages to the terminal in a sequence of "a new voice message→an unplayed voice message before the refresh→a played voice message after the refresh". Additionally, the server may further transmit a tree after an increase or reduction to the terminal.

In step 809, the terminal redraws a background visual rendering layer and adjusts a location of the voice message. The terminal redraws the background visual rendering layer according to the tree after the increase or reduction, and adjusts locations of the voice messages in a voice element layer according to the voice messages transmitted by the server in order. Then, the terminal superposes the ambient atmosphere layer, the re-rendered background visual rendering layer, and the re-rendered voice element layer, to obtain a voice message presentation interface after the refresh.

In step 810, the terminal browses and clicks a voice that a user is interested in. In the "Voice forest" interface 73, the m other voice messages are displayed at the top of the tree, the unplayed voice messages in the n voice messages before the refresh are displayed on the middle and lower parts of the tree, and the played voice messages in the n voice messages before the refresh are displayed on the lawn under the tree. The user that makes a selection may view the middle and lower parts of the tree and the lawn under the tree in a sliding-up manner. When a quantity of the voice messages is relatively large, and the tree is relatively high, the "Voice forest" interface 73 preferentially displays the top end part of the tree, and displays the middle and lower parts of the tree and the lawn under the tree when the user slides up. When the "Voice forest" interface 73 displays a voice message that the user is interested in, if the user clicks the voice message, or clicks a virtual character corresponding to the voice message, then the instant messaging program plays the voice message.

In step 811, the terminal detects that the voice message presentation interface stays for more than three seconds. The instant messaging program starts timing a displayed duration of the voice message presentation interface. If the displayed duration of the voice message presentation interface is longer than three seconds, step 812 is performed.

In step 812, the terminal transmits an instruction to the server. The terminal transmits a stay trigger instruction to the server, and the stay trigger instruction is used for triggering the server to recognize the unplayed voice messages in the voice message presentation interface.

In step 813, the server recognizes an unplayed voice message in a current interface. The server stores playbacks record of all voice messages, and the server recognizes the unplayed voice messages in the voice message presentation interface according to the playback records.

In step 814, the server performs shake by using the bird image as a center. For a bird corresponding to the unplayed voice message, the server generates a shake instruction and/or a shake animation material for performing a shake by using the bird image as a center.

In step 815, the server transmits data to the terminal. The server transmits a shake instruction and/or a shake animation material for shaking the unplayed voice messages to the terminal.

In step 816, the terminal redraws an animation of the voice element layer. When receiving a shake instruction of an unplayed voice message transmitted by the server, the terminal redraws a virtual character corresponding to the unplayed voice message in the voice element layer according to the shake animation material stored locally. When receiving a shake animation material of an unplayed voice message transmitted by the server, the terminal redraws a virtual character corresponding to the unplayed voice message in the voice element layer according to the shake animation material.

For a display process of the terminal shaking a character model of a bird, refer to FIG. 16.

In the foregoing embodiments, an example in which the server executes a part of calculation logic is used for description. However, in different software architectures, the foregoing calculation logic executed by the server may alternatively be executed by the terminal. Of course, this is not limited in this embodiment of this application.

FIG. 6, FIG. 7, FIG. 15, FIG. 18, and FIG. 25 are schematic flowcharts of a voice message display method according to an embodiment. It is to be understood that although the steps in the flowcharts of FIG. 6, FIG. 7, FIG. 15, FIG. 18, and FIG. 25 are sequentially displayed in accordance with instructions of arrows, the steps are not necessarily performed sequentially in the order indicated by the arrows. Unless otherwise explicitly specified in this application, execution of the steps is not strictly limited, and the steps may be performed in other orders. Moreover, at least some of the steps in FIG. 6, FIG. 7, FIG. 15, FIG. 18, and FIG. 25 may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the other step.

The following is an apparatus embodiment in this application. For details not specifically described in the apparatus embodiment, refer to a corresponding description in the foregoing corresponding method embodiment.

Figure 26:
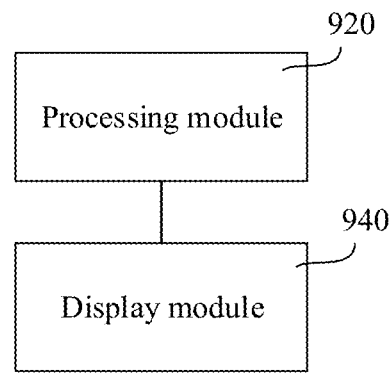
FIG. 26 is a block diagram of a voice message display apparatus according to another exemplary embodiment of this application.

FIG. 26 is a block diagram of a voice message display apparatus according to an exemplary embodiment of this application. The voice message display apparatus is configured into a terminal on an APP is installed, and the voice message display apparatus may be implemented through software or hardware, and the APP is capable of receiving a voice message. The apparatus includes a processing module 920 and a display module 940. As described above, one or more of the modules described in this specification can be implemented by processing circuitry.

The processing module 920 is configured to start the APP according to a start operation. The processing module 920 is configured to obtain n voice messages published by at least one user account, where n is a positive integer.

The display module 940 is configured to display a voice message presentation interface of the APP, the voice message presentation interface displaying the voice message in a virtual world, the voice message being displayed by using a visible element in the virtual world as a carrier. In an optional embodiment, the visible element includes a virtual character. The display module 940 is configured to obtain virtual characters respectively corresponding to the n voice messages in the virtual world; generate a scene screen of the virtual world, the scene screen displaying the virtual characters and the voice messages corresponding to the virtual characters; and display the voice message presentation interface of the APP according to the scene screen of the virtual world. At least one of the virtual character and the voice message is used for playing corresponding message content when a trigger operation is received.

In an optional embodiment, the processing module 920 is configured to determine a virtual character corresponding to the voice message according to a message attribute of the voice message. In a further embodiment, the processing module 920 can be configured to determine a character parameter of the virtual character corresponding to the voice message according to a message duration of the voice message. Alternatively, the processing module 920 is configured to determine a character parameter of the virtual character corresponding to the voice message according to a published duration of the voice message, the published duration being a duration of timing starting from an upload time of the voice message. Alternatively, the processing module 920 is configured to determine a character parameter of the virtual character corresponding to the voice message according to an unplayed duration of the voice message in an unplayed state after the voice message is displayed, the character parameter including at least one of a type, an animation style, an animation frequency, and a special character effect of a character model.

Figure 27:
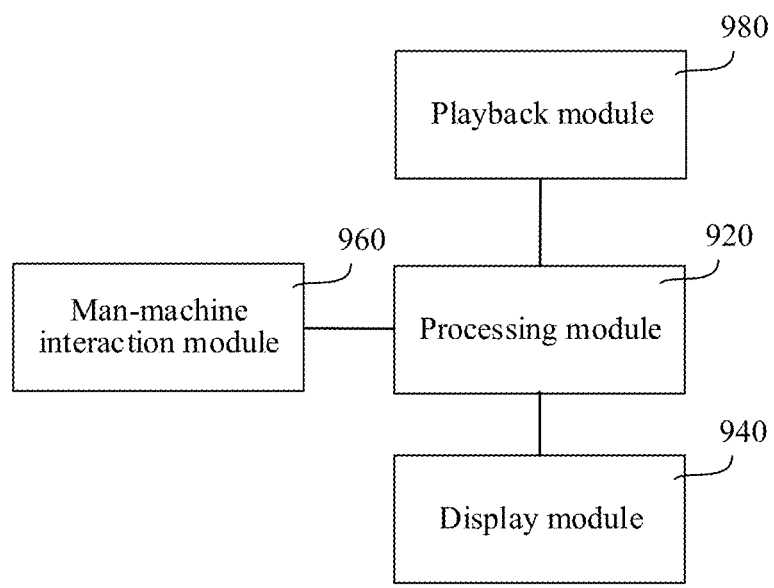
FIG. 27 is a block diagram of a voice message display apparatus according to another exemplary embodiment of this application.

In an optional embodiment, as shown in FIG. 27, the foregoing apparatus can further include a man-machine interaction module 960 and a playback module 980. The man-machine interaction module 960 is configured to receive a trigger operation of at least one of the virtual character and the voice message in the voice message presentation interface, the trigger operation including at least one of a click operation and a slide operation. The playback module 980 is configured to play the voice message corresponding to the virtual character according to the trigger operation.

Optionally, the man-machine interaction module 960 is further configured to receive operations related to the user. For example, the man-machine interaction module is further configured to receive a start operation, to help the processing module 920 start the APP according to the start operation.

In an optional embodiment, the display module 940 is further configured to display a friend-add control corresponding to the virtual character. The man-machine interaction module 960 is further configured to receive a first operation used for triggering the friend-add control. The processing module 920 is further configured to establish a friend relationship with a user account corresponding to the virtual character according to the first operation.

In a further embodiment, the display module 940 is further configured to display a favorite control corresponding to the virtual character. The man-machine interaction module 960 is further configured to receive a second operation used for triggering the favorite control. The processing module 920 is further configured to add the voice message corresponding to the virtual character to favorites according to the second operation.

In an embodiment, the processing module 920 can be further configured to control, in a case that an unplayed duration of a first voice message in the voice message presentation interface does not reach an unplayed threshold, a first virtual character corresponding to the first voice message to perform a preset reminder action.

In an optional embodiment, the processing module 920 is further configured to control, in a case that unplayed durations of a first voice message and a second voice message in the voice message presentation interface do not reach an unplayed threshold, a first virtual character and a second virtual character to exchange locations, the first virtual character being a virtual character corresponding to the first voice message, and the second virtual character being a virtual character corresponding to the second voice message.

In an optional embodiment, the processing module 920 is further configured to replace, in a case that a third voice message in the voice message presentation interface changes from an unplayed state to a played state, the third voice message with a fourth voice message that is in an unplayed state in the voice message presentation interface, and replace a third virtual character with a fourth virtual character, the fourth virtual character being a virtual character corresponding to the fourth voice message, and the third virtual character being a virtual character corresponding to the third voice message, and remove the third voice message and the third virtual character out of the voice message presentation interface, or move the third voice message and the third virtual character into a designated region in the voice message presentation interface.

In an optional embodiment, the man-machine interaction module 960 is further configured to receive a refresh operation in the voice message presentation interface. The processing module 920 is further configured to obtain m other voice messages according to the refresh operation. The display module 940 is further configured to display an unplayed voice message in the n voice messages, a virtual character corresponding to the unplayed voice message, the m other voice messages, and virtual characters corresponding to the other voice messages in the voice message presentation interface at the same time. In an optional embodiment, the virtual world is a virtual forest world.

The display module 940 is configured to display a scene screen of the virtual forest world in the voice message presentation interface, the scene screen including a tree located in the virtual forest world, the m other voice messages and the virtual characters corresponding to the other voice messages being displayed on an upper part of the tree, and the unplayed voice message in the n voice messages and the virtual character corresponding to the unplayed voice message being displayed on middle and lower parts of the tree. The virtual character can be a bird in the tree located in the virtual forest world.

In an optional embodiment, the processing module 920 is further configured to determine a height of the tree according to a first message quantity of the unplayed voice messages in the n voice messages and a second message quantity of the m other voice messages.

A sum of the first message quantity and the second message quantity is positively correlated to the height of the tree.

In an optional embodiment, there is at least one played voice message in the n voice messages.

The display module 940 is further configured to cancel displaying of the played voice messages in the n voice messages and the virtual characters corresponding to the played voice messages. Alternatively, the display module 940 is further configured to display the virtual characters corresponding to the played voice messages in the n voice messages on the lawn under the tree. In an optional embodiment, the virtual world is a virtual forest world.

The display module 940 is further configured to render the ambient atmosphere layer, the background visual layer, and the voice element layer respectively, the ambient atmosphere layer including the sky and ground in the virtual forest world, the background visual layer including the tree in the virtual forest world, and the voice element layer including the virtual character and the voice message corresponding to the virtual character, and superpose the ambient atmosphere layer, the background visual layer, and the voice element layer to be displayed as the voice message presentation interface. The virtual character may be any animal in the virtual forest.

In an optional embodiment, the voice message presentation interface is a UI used for displaying a voice message published by an unfamiliar user account. Alternatively, the voice message presentation interface is a UI used for displaying voice messages published by user accounts in the same topic. Alternatively, the voice message presentation interface is a UI used for displaying voice messages published by user accounts belonging to the same area.

This application further provides a non-transitory computer-readable storage medium, the storage medium storing at least one instruction, at least one program, a code set, or an instruction set, the at least one instruction, the at least one program, the code set, or the instruction set being loaded and executed by a processor to implement the voice message display method according to the foregoing method embodiments.

Optionally, this application further provides a computer program product including instructions, and the computer program product, when run on a computer device, causes the computer device to perform the voice message display method provided in the foregoing method embodiments.

A person of ordinary skill in the art may understand that all or some of the steps of the embodiments may be implemented by hardware or a program instructing relevant hardware. The program may be stored in a computer-readable storage medium. The storage medium mentioned above may be a read-only memory, a magnetic disk, or an optical disc.

The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A method for displaying voice messages, comprising:
   obtaining n voice messages from at least one user account, n being a positive integer; and
   displaying a voice message presentation interface, the voice message presentation interface being configured to display virtual characters corresponding to the n voice messages in an image of a virtual world, display locations of the n voice messages in the image of the virtual world being based on whether the n voice messages are unplayed, and the virtual characters being based on respective message attributes of the n voice messages.

2. The method according to claim 1, further comprising:
   receiving a trigger operation of at least one of (i) a virtual character in the virtual characters and (ii) a voice message corresponding to the virtual character in the voice message presentation interface; and
   playing the voice message corresponding to the virtual character according to the trigger operation.

3. The method according to claim 1, further comprising:
   controlling a first virtual character corresponding to a first voice message in the n voice messages to perform a reminder action when an unplayed duration of the first voice message does not reach an unplayed threshold.

4. The method according to claim 1, further comprising:
   controlling a first virtual character and a second virtual character to exchange locations when unplayed durations of a first voice message and a second voice message in the voice message presentation interface do not reach an unplayed threshold, the first virtual character corresponding to the first voice message in the n voice messages, and the second virtual character corresponding to the second voice message in the n voice messages.

5. The method according to claim 1, further comprising:
   in response to a third voice message in the voice message presentation interface changing from an unplayed state to a played state,
      replacing the third voice message with a fourth voice message in an unplayed state in the voice message presentation interface and replacing a third virtual character corresponding to the third voice message with a fourth virtual character corresponding to the fourth voice message; and
      performing one of (i) removing the third voice message and the third virtual character out of the voice message presentation interface and (ii) moving the third voice message and the third virtual character into a designated region in the voice message presentation interface.

6. The method according to claim 1, wherein
   the method includes:
      receiving a refresh operation in the voice message presentation interface; and
      obtaining m other voice messages according to the refresh operation; and
   the displaying the voice message presentation interface includes displaying an unplayed voice message in the n voice messages, a virtual character corresponding to the unplayed voice message, the m other voice messages, and virtual characters corresponding to the m other voice messages in the voice message presentation interface at a same time.

7. The method according to claim 6, wherein
   the displaying the m other voice messages and the virtual characters corresponding to the m other voice messages includes displaying the m other voice messages and the virtual characters corresponding to the m other voice messages in a first region in the voice message presentation interface; and
   the displaying the unplayed voice message and the virtual character corresponding to the unplayed voice message includes displaying the unplayed voice message and the virtual character corresponding to the unplayed voice message in a second region in the voice message presentation interface, the second region being below the first region.

8. The method according to claim 7, wherein
   a voice message in the n voice messages is a played voice message; and
   the method further includes displaying the played voice message and the virtual character corresponding to the played voice message in a third region in the voice message presentation interface, the third region being below the second region.

9. The method according to claim 6, wherein
   the virtual world is a virtual forest world, and
   the displaying the unplayed voice message, the virtual character corresponding to the unplayed voice message, the m other voice messages, and the virtual characters corresponding to the m other voice messages further includes:
      displaying a scene of the virtual forest world in the voice message presentation interface, the scene including a tree located in the virtual forest world, the m other voice messages and the virtual characters corresponding to the m other voice messages being displayed on a first part of the tree, and the unplayed voice message, the virtual character corresponding to the unplayed voice message being displayed on a second part of the tree that is below the first part.

10. The method according to claim 9, wherein
    a voice message in the n voice messages is a played voice message; and
    the played voice message and a virtual character corresponding to the played voice message are displayed in a region under the tree.

11. The method according to claim 1, further comprising:
    detecting whether a duration where no operation is performed in the voice message presentation interface reaches a threshold; and in response to the duration reaching the threshold,
transmitting an instruction to trigger a server to recognize an unplayed voice message in the voice message presentation interface;
receiving a shake instruction from the server; and
causing a virtual character corresponding to the unplayed voice message in the voice message presentation interface to shake.

12. A terminal device, comprising:
processing circuitry configured to:
obtain n voice messages from at least one user account, n being a positive integer; and
display a voice message presentation interface, the voice message presentation interface being configured to display virtual characters corresponding to the n voice messages in an image of a virtual world, display locations of the n voice messages in the image of the virtual world being based on whether the n voice messages are unplayed, and the virtual characters being based on respective message attributes of the n voice messages.

13. The terminal device according to claim 12, wherein the processing circuitry is configured to:
receive a trigger operation of at least one of (i) a virtual character in the virtual characters and (ii) a voice message corresponding to the virtual character in the voice message presentation interface; and
play the voice message corresponding to the virtual character according to the trigger operation.

14. The terminal device according to claim 12, wherein the processing circuitry is configured to:
control a first virtual character corresponding to a first voice message in the n voice messages to perform a reminder action when an unplayed duration of the first voice message does not reach an unplayed threshold.

15. The terminal device according to claim 12, wherein the processing circuitry is configured to:
control a first virtual character and a second virtual character to exchange locations when unplayed durations of a first voice message and a second voice message in the voice message presentation interface do not reach an unplayed threshold, the first virtual character corresponding to the first voice message in the n voice messages, and the second virtual character corresponding to the second voice message in the n voice messages.

16. The terminal device according to claim 12, wherein the processing circuitry is configured to:
in response to a third voice message in the voice message presentation interface changing from an unplayed state to a played state,
replace the third voice message with a fourth voice message in an unplayed state in the voice message presentation interface and replacing a third virtual character corresponding to the third voice message with a fourth virtual character corresponding to the fourth voice message; and
perform one of (i) removing the third voice message and the third virtual character out of the voice message presentation interface and (ii) moving the third voice message and the third virtual character into a designated region in the voice message presentation interface.

17. The terminal device according to claim 12, wherein the processing circuitry is configured to:
receive a refresh operation in the voice message presentation interface;
obtain m other voice messages according to the refresh operation; and
display an unplayed voice message in the n voice messages, a virtual character corresponding to the unplayed voice message, the m other voice messages, and virtual characters corresponding to the m other voice messages in the voice message presentation interface at a same time.

18. The terminal device according to claim 17, wherein the processing circuitry is configured to:
display the m other voice messages and the virtual characters corresponding to the m other voice messages in a first region in the voice message presentation interface; and
display the unplayed voice message and the virtual character corresponding to the unplayed voice message in a second region in the voice message presentation interface, the second region being below the first region.

19. The terminal device according to claim 18, wherein
a voice message in the n voice messages is a played voice message; and
the processing circuitry is configured to display the played voice message and the virtual character corresponding to the played voice message in a third region in the voice message presentation interface, the third region being below the second region.

20. A non-transitory computer-readable storage medium, storing at least one program that, when executed by a processor, causes the processor to perform:
obtaining n voice messages from at least one user account, n being a positive integer; and
displaying a voice message presentation interface, the voice message presentation interface being configured to display virtual characters corresponding to the n voice messages in an image of a virtual world, display locations of the n voice messages in the image of the virtual world being based on whether the n voice messages are unplayed, and the virtual characters being based on respective message attributes of the n voice messages.

* * * * *